United States Patent [19]

Osborne

[11] Patent Number: 5,790,804
[45] Date of Patent: Aug. 4, 1998

[54] COMPUTER NETWORK INTERFACE AND NETWORK PROTOCOL WITH DIRECT DEPOSIT MESSAGING

[75] Inventor: Randy B. Osborne, Cambridge, Mass.

[73] Assignee: Mitsubishi Electric Information Technology Center America, Inc., Cambridge, Mass.

[21] Appl. No.: 596,708

[22] Filed: Feb. 5, 1996

Related U.S. Application Data

[63] Continuation of Ser. No. 226,541, Apr. 12, 1994, abandoned.

[51] Int. Cl.$^6$ .................................................. G06F 15/163
[52] U.S. Cl. ......................................................... 395/200.75
[58] Field of Search ............................................ 395/200.75

[56] References Cited

U.S. PATENT DOCUMENTS

| | | | |
|---|---|---|---|
| 4,947,317 | 8/1990 | DiGiulio et al. | 395/285 |
| 5,125,096 | 6/1992 | Brantley et al. | 395/200.65 |
| 5,317,739 | 5/1994 | Elko et al. | 395/200.46 |
| 5,412,803 | 5/1995 | Bartow et al. | 395/200.43 |
| 5,428,771 | 6/1995 | Daniels et al. | 395/671 |
| 5,434,978 | 7/1995 | Dockter et al. | 395/200.6 |

OTHER PUBLICATIONS

Thornsten von Eiken et al., "Active Messages; A Mechanism for Integrated Communication and Computation," ACM (1992), pp. 256–266.

Chandramohan A. Thekkath et al., Efficient Support for Multi–Computing on ATM Networks, Dept. Computer Science, Tech. Rpt. University of Washington (Apr. 1993), pp. 1–17.

John Wilkes, "Hamlyn—An Interface for Sender–Based Comunications," Hewlett–Packard Publication No. HPL–OSR–92–13 (Nov. 1992), pp. 1–16.

Alfred Z. Spector, "Performing Remote Operations Efficiently on a Local Computer Network," Communications of the ACM, vol. No. 4, (Apr. 1982), pp. 246–260.

William J. Dally, et al., "The Message Driven Processor; An Integrated Multicomputer Processing Element," Proceedings of the 1992 IEEE International Conference on Computer Design: VLSI in Computers & Processors (Oct. 1992), pp. 127.

William J. Dally, et al., "Architecture of a Message–Driven Processor," International Symposium on Computer Architecture, 1987, p. 1.

William J. Dally, "Fine–Grain Concurrent Computing," Research Directions in Computer Science: An MIT Perspective, Edited by Albert Meyer, MIT Press, 1991, p. 127.

*Primary Examiner*—Parshotam S. Lall
*Assistant Examiner*—Kenneth R. Coulter
*Attorney, Agent, or Firm*—Robert K. Tendler

[57] ABSTRACT

A network protocol and interface using direct deposit messaging provides low overhead communication in a network of multi-user computers. This system uses both sender-provided and receiver-provided information to process received messages and to deposit data directly in memory and to conditionally interrupt a host processor based on control information. Message processing is separated into data delivery, which bypasses the host processor and operating system, and message actions which may or may not require host processor interaction. In this protocol, a message includes an indication of the operation desired by the sender, an operand specified by the sender and an operand which refers to some information stored at the receiver. The receiver ensures that the desired action is permitted and then, if the action is permitted, performs the action according to both the operand specified by the sender and the state of the receiver. The action may be message delivery, wherein the operands in the message specify values for use in various addressing modes including direct, indirect, post-increment and index modes. The action may also be conditionally generating an interrupt, wherein the operands are used, in combination with the receiver state, to determine whether a message requires immediate or delayed action. The action may also be an operation on a register in the network interface or on other information stored at the receiver.

17 Claims, 12 Drawing Sheets

COMPUTER NETWORK INTERFACE AND NETWORK PROTOCOL WITH DIRECT DEPOSIT MESSAGING

This application is a continuation of application Ser. No. 08/226,541 filed Apr. 12, 1994, now abandoned.

FIELD OF THE INVENTION

This invention relates to computer network interfaces and protocols and more particularly to such interfaces and protocols for low overhead communication. The invention is particularly applicable to asynchronous transfer mode (ATM) networks and local-area networks (LANS).

BACKGROUND OF THE INVENTION

A communication system is a significant part of any modern computer system. A fundamental characteristic of any such communication system is the communication overhead. Such overhead determines the kinds of applications that can be exploited efficiently. Low overhead communication (low latency and low impact on a host as defined below) is particularly important in parallel, distributed, or real-time computing systems.

In general, two fundamental properties in communication systems contribute to overhead. The first is data delivery and the second is message action. Specifically, data delivery requires addressing at the receiver and message action requires interrupts to invoke message action at the receiver. Thus, communication involves both data delivery, transferring data from a sender to a receiver, and message action, invoking some special action, such as synchronization, on arrival of data at the receiver. Message action is often requested by interrupting the processor at the receiver.

Communication systems can be classified according to the division of burden between sender and receiver. In a receiver-based system, information controlling data delivery and message action is localized to the receiver. In contrast, in a sender-based system, the sender plays a more direct role by specifying information in each message to control data delivery and message action. The key information for data delivery is the destination address of the data. In systems using receiver-based addressing, the source has no direct input on the final address of a message: a message identifies a buffer at the receiver into which the message is stored at some implicit location, e.g. by sequencing a pointer. By contrast, in systems using sender-based addressing, the source specifies an address, contained in each message, indicating directly where the message should be stored at the receiver. Receiver-based addressing involves significant overhead in comparison to sender-based addressing. However, sender-based addressing raises protection issues.

The key information for message action, is whether to generate an interrupt on message arrival. In systems using receiver-based interrupts, an interrupt is generated by the receiver on the arrival of every message. In systems using sender-based interrupts, the sender specifies, by information contained in each message, whether or not an interrupt should be generated on the arrival of that message.

Most conventional communication systems are receiver-based, such as the typical ethernet network using the Internet protocol. Most open, public local area networks use this kind of protocol as well.

Several systems use purely sender-based addressing. For example, there is a system called "Hamlyn," of which an implementation in hardware is discussed in "Hamlyn: An Interface for Sender-Based Communication," by John Wilkes in *Technical Report* HPL-OSR-92-13, Hewlett-Packard Laboratories, November 1992. One difficulty with the published work on Hamlyn is that it merely provides a high level design overview, with few implementation specifics. This system includes sufficient protection mechanisms for a multi-user LAN environment, but the published work does not specialize it to any network, only an unspecified "private multicomputer interconnect," similar to others for parallel machines.

Another system similar to Hamlyn is described in "Efficient Support for Multicomputing on ATM Networks" by C. Thekkath et al., *Technical Report* TR93-04-03, Dept. of Computer Science and Engineering, Univ. of Washington, Seattle, Wash. Apr. 12, 1993. This system is a software-based emulation of purely sender-based addressing specialized to ATM LANs, designed for distributed system applications. Hardware support for sender-based addressing is not addressed by Thekkath et al.

One problem with systems which use purely sender-based addressing is that in many cases the location at the receiver where data is to be placed should be dependent on the state of the receiver. For example, if incoming messages are to be queued at the receiver, the location of the end of the queue is dependent on the receiver state. To handle queueing in a purely sender-based addressing system, the sender must know the state of the receiver. Therefore, the sender must either keep track of this location, which becomes difficult when there is more than one sender sending to the same receiver, or use additional messages to determine the state of the receiver, which introduces atomicity issues. Either of these options increases both latency and impact on the host processors of the sender and receiver. Also, such extensive knowledge of the receiver by the sender raises protection problems. Similarly, sender-based interrupts also have problems. The sender based nature limits the possible interrupt operations. For example, if the interrupt status is only a function of the state maintained by the sender, it becomes difficult to priority schedule interrupts at the receiver.

To overcome some of the communication overhead problems with either purely sender-based: or purely receiver-based communication, many new parallel machines use variations of both sender-based and receiver-based addressing. For example, the Meiko CS-2, of Waltham, Mass., supports both traditional send/receive communication using receiver-based addressing and a remote read/write model using sender-based addressing. To support bulk data transfer, the CS-2, like many machines, has a co-processor for demultiplexing and DMA to memory. This DMA usually has scatter/gather capability, though typically only with constant stride, and thus falls short of sender-based addressing. The sender-based and receiver-based addressing modes are combined mutually exclusively. This mutual exclusive combination is also true of other new parallel machines which use sender-based and receiver-based addressing. In the MIT Alewife machine and the Stanford FLASH machine, cache blocks for shared memory traffic use sender-based addressing, while bulk data transfers and send-receive traffic use receiver-based addressing. Generally, sender-based addressing is used for random access communication and receiver-based addressing is used for protected, cross-domain communication.

Some similar work which combines both sender-based and receiver-based addressing is a system which is described in "Active Messages: A mechanism for Integrated Communication and Computation" in *Int'l Symposium of Computer Architecture*, pp. 256–266, May 1992, by T. von Eicken et al. In that system, the sender attaches to each message an address in the receiver of an interrupt handler which is invoked upon message delivery to extract the message from the network and deposit or process the message as desired. The message may also include other arguments. The interrupt handlers are constrained in length and action and are executed using the host processor in the receiver address space so that they run without the cost of a context switch to a new thread. A major problem with this system is that it is restricted, at least without hardware support, to single user applications, because context switching is otherwise required. An additional problem with this system is that it also treats all messages at the receiver as requiring an interrupt and thus does not reduce the impact on the processor.

By way of further background, William Dally presents in Dally, W. J. et al. "Architecture of a Message-Driven Processor", in *International Symposium on Computer Architecture*, 1987; Dally, W. J. et al., "The Message Driven Processor: An Integrated Multicomputer Processing Element", *Proceedings of the 1982 IEEE International Conference On Computer Design: VLSI In Computers & Processors*, Cambridge, Mass., Oct. 11–14, 1992; and Dally, W. J. et al., "Fine-Grain Concurrent Computing", in *Research Directions in Computer Science: An MIT Perspective*, edited by Albert Meyer, MIT Press, 1991, a message driven processor system, in which a non-conventional host processor executes communication actions using built-in communication primitives without benefit of a separate network interface. The primary disadvantage of this system is this lack of a separate network interface which would otherwise permit the use of conventional processors. Protection issues, especially for user-to-user level communication, for a multi-user system are also not addressed. Additionally, this system is not well-adapted to ATM networks because the message format is incompatible.

In a multi-user network environment, typified by a local-area network (LAN), communication is a global resource for which protection must be provided to isolate a user on one processor from accidental or malicious interference from another user on another processor. Also, if the nodes are multi-user as well, protection must also be provided to similarly isolate users from each other on the same processor. There has been very little work on achieving low overhead in this type of multi-user network and multi-user processor environment.

SUMMARY OF THE INVENTION

To overcome these problems and limitations with the prior art, this invention provides a network protocol and interface for low overhead communication in a network of multiuser computers based on direct deposit messaging. Direct deposit messaging signifies directly demultiplexing messages and depositing both data and control information directly where they are needed, e.g., data in memory, and control in (conditionally) interrupting the host processor. In such a system, asynchronous events are controlled by separating events by their need for the host processor. Events, such as data delivery, which do not require the host processor are handled directly, e.g., by depositing data directly into user memory. Events, chiefly synchronization, that require interaction with the host processor are divided into immediate actions that require immediate service and delayable actions that are accumulated and processed at some time convenient for the host processor, thereby turning them into synchronous events. With this separation of data and control events, resources sufficient to bypass the non-host processor events rather than all events, is all that is needed.

To obtain effective separation of these events, the receiver processes a message using information in the message from the sender. The receiver action in response to a message depends both on this sender information and information stored at the receiver. A message therefore includes an indication of the operation desired by the sender, one or more operands specified by the sender and one or more operands which refers to some state maintained by the receiver. The receiver ensures that the desired action is permitted and then, if the action is permitted, performs the action according to the operand specified by the sender and the state maintained by the receiver.

The action performed by the receiver may be message delivery, wherein an operand in the message specifies values for use in various addressing modes, such as direct, indirect, post-increment and index modes. Data is either written or read from such addresses directly, without host processor or operating system intervention while maintaining multiuser protection. The action may also be conditionally generating an interrupt, wherein an operand is used in combination with the receiver state to determine whether a message requires immediate or delayed action. The action may involve special memory locations, called address registers, contained in the network interface. This network interface is especially useful for asynchronous transfer mode (ATM) networks in which messages are compared of fixed size primitive data units called cells.

The interface design also supports a multi-cell format in which a first cell in a stream of cells is a control cell, and subsequent cells contain purely data. This enhancement provides increased bandwidth.

It is also possible to have endpoints which overlap to allow controlled sharing between endpoints in a flexible manner. Access to address registers is limited to a contiguous block of registers called a window. As with endpoints, address register windows may be overlapped and nested with other address register windows to allow controlled sharing between address register windows in a flexible manner. Address register protection may also be provided to restrict access of the sender to different registers.

Numerous other enhancements may be made, including integrating exception handling and flow control, paging connection and endpoint tables, adding global address registers, and using hybrid mapping to reduce translation look-aside buffer misses.

It is also possible to provide higher level operations executable at the receiver as part of an instruction memory accessible by an instruction pointer found in the operation field of a message. Thus, the sender may be isolated from some knowledge of the receiver. The full spectrum of operation of sender-based addressing and receiver-based addressing is thus provided.

With this system, communication overhead is reduced by allowing the sender to specify as much as possible about the intended action for the message, while still allowing the receiver to control message reception for protection and receiver-dependent operations. Thus, both sender and receiver information is used to demultiplex messages directly to where they are needed, reducing latency. The processor at the receiver is involved only when synchronization is required. That is, interrupts are eliminated for every message; an interrupt is generated only when a message requires immediate action. Thus, impact on the processor is reduced. This combination of control of asynchronous events and direct deposit messaging provides flexibility and reduced overhead with both full protection and separation of control and data. This network interface and protocol is applicable across a wide range of networks and across a wide range of applications in parallel, distributed, and real-time computing.

In summary, a network protocol and interface using direct deposit messaging provides low overhead communication in a network of multi-user computers. This system uses both sender-provided and receiver-provided information to process received messages and to deposit both data and control information directly where they are needed: data in memory and control information in conditionally/optionally interrupting a host processor. Message processing is separated into data delivery, which bypasses the host processor and operating system, and message actions which may or may not require host processor interaction. In this protocol, a message includes an indication of the operation desired by the sender, an operand specified by the sender and an operand which refers to some information stored at the receiver. The receiver ensures that the desired action is permitted and then, if the action is permitted, performs the action according to both the operand specified by the sender and the state of the receiver. The action may be message delivery, wherein the operands in the message specify values for use in various addressing modes including direct, indirect, post-increment and index modes. The action may also be conditionally generating an interrupt, wherein the operands are used, in combination with the receiver state, to determine whether a message requires immediate or delayed action. The action may also be an operation on a register in the network interface or on other information stored at the receiver. The network interface and protocol are intended for use with local-area networks. Specializations of this interface and protocol are particularly applicable to asynchronous transfer mode (ATM) networks. The network interface includes endpoints which may be nested and overlapped, address registers which may be organized into windows which may be nested and overlapped, address register protection and integration of exception handling and flow control.

DETAILED DESCRIPTION

The present invention will be more completely understood through the following detailed description which should be read in conjunction with the attached drawing in which similar reference numbers indicate similar structures. All references, including publications and patent applications, cited above and following are hereby expressly incorporated by reference.

Figure 1:
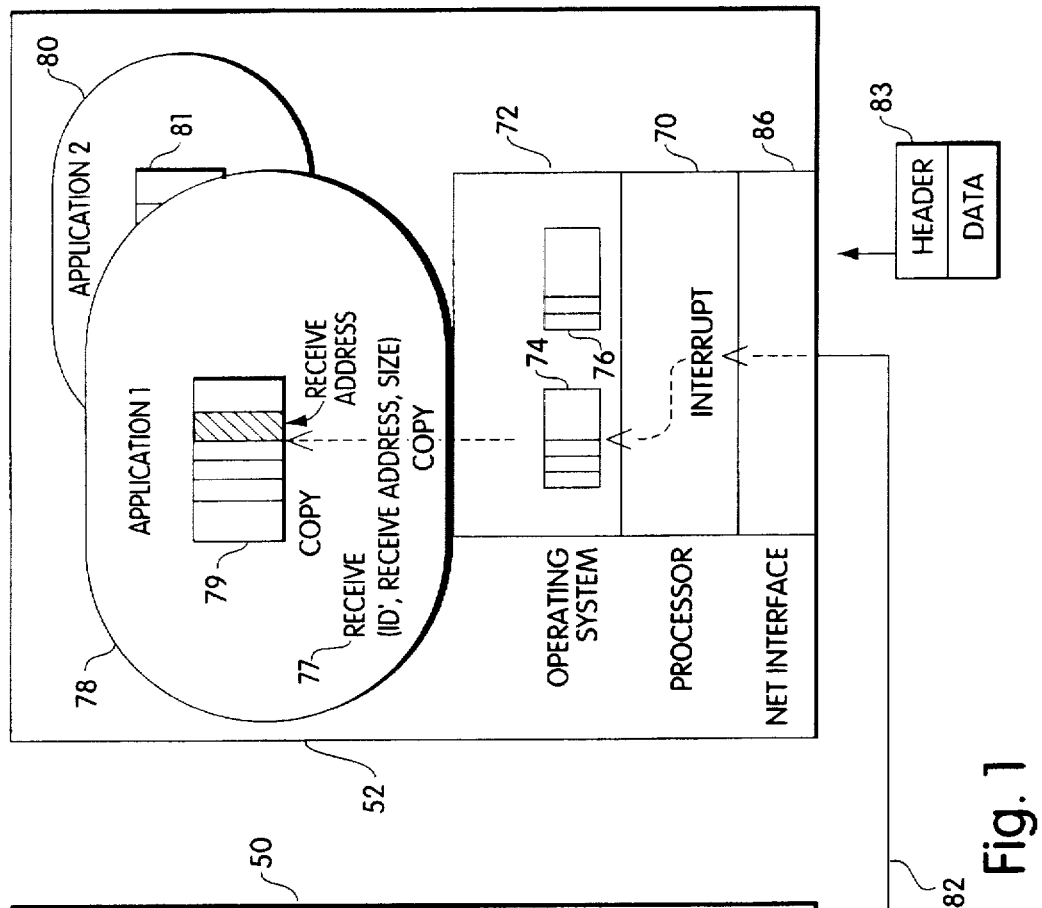
FIG. 1 is a block diagram of a typical conventional computer system with a communication system using receiver-based addressing.
Figure 1:
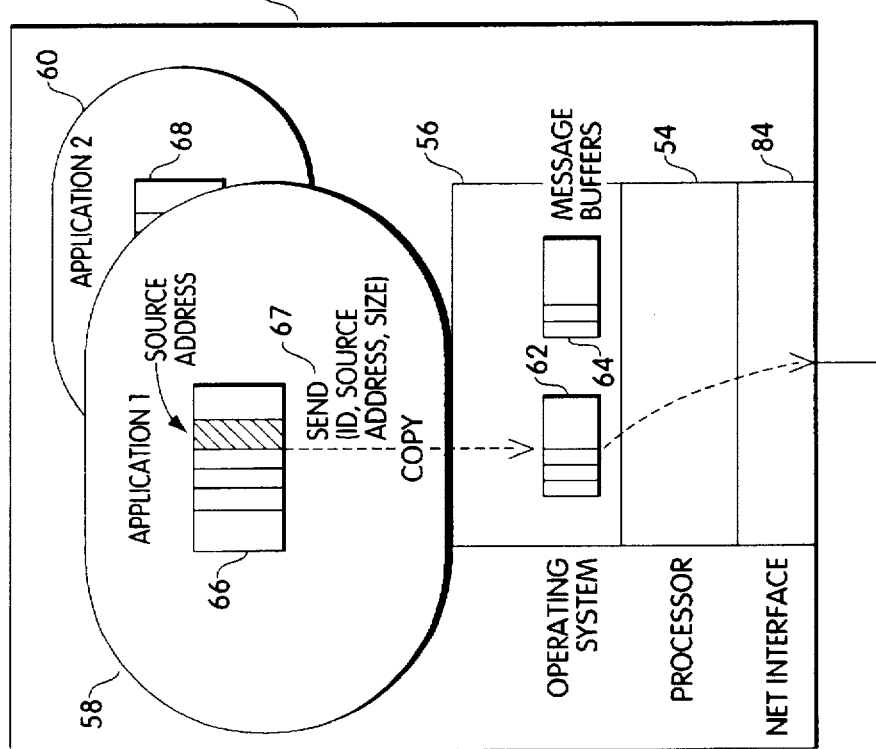

A typical computer system is shown in FIG. 1, and includes, for purposes of illustration, a first computer (hereinafter called the sender) 50 and a second computer (hereinafter called the receiver) 52. It should be understood that the reference to sender and receiver are used merely for ease of illustration. The sender 50 and the receiver 52 are interconnected by a network 82 via respective network interfaces 84 and 86. Although FIG. 1 shows two computers (i.e., sender 50 and receiver 52), the system is not limited to two computers. There may be multiple senders and one receiver, multiple receivers and one sender or multiple senders and receivers. Also, each such computer may also comprise interconnected processors. Finally, the sender and receiver may be interconnected processors within a single computer such as one parallel computer. The term node as used herein signifies any sender or receiver. Each node is assumed to have its own virtual address space (i.e., the nodes are assumed to have virtual memory) distinct and independent from that in other nodes. The network is potentially used by multiple non-cooperating users and each node may be used by more than user. Thus, protection mechanisms are typically provided to protect against accidental or malicious interference with a process of one user by another user. For example, there are mechanisms to prevent one user from 1) unauthorized sending of messages to another user, 2) unauthorized access to memory of another user or 3) trying to appear as another user to a receiver. These mechanisms are commonly found in standard extensible networks interconnecting multiple users and are often not found in closed, proprietary networks.

The sender 50 includes a processor 54 connected to the network interface 84 and programmed according to a desired operating system, illustrated at 56. The operating system 56 is a computer program which manages node resources such as memory, processor time and network access, arbitrates and protects applications from each other, and controls interaction between applications, such as applications 58 and 60 in FIG. 1 and the processor 54. The operating system 56 has associated therewith message buffers 62 and 64 which are used to send messages across the network interface 84 to the receiver computer 52. Each application 58, 60, has associated therewith respective memory portions 66 and 68 which may be called endpoint buffers or simply endpoints.

Similarly, receiver computer 52 includes a processor 70 connected to the network interface 86. The processor 70 is programmed according to a desired operating system 72 as illustrated in FIG. 1. Similar to the sender, the operating system 72 and receiver 52 includes message buffers 74 and 76. Applications 78 and 80 also have associated therewith memory portions 79 and 81, which also may be called endpoint buffers or simply endpoints.

In general the sender or receiver may include other processors such as a network co-processor or other co-processors. To remove ambiguity, processors 54 and 70 are referred to as "host processors" herein.

A message (shown at 83) in a conventional system includes a header which is used by the network 82 and the network interfaces 84, 86 to direct the message to the appropriate node and endpoint.

Figure 2:
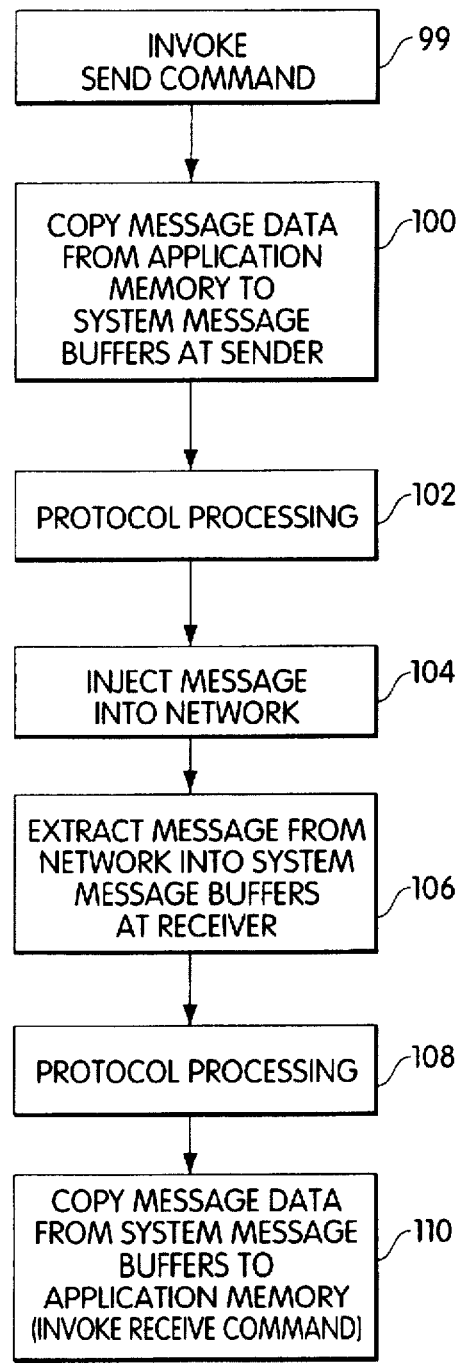
FIG. 2 is a flow chart describing a conventional communication process for the computer system of FIG. 1.

An application, such as 58, at the sender 50 and receiver 52 communicate by sending messages to each other across the network 82. The message may include any data, including a procedure call. As shown in FIG. 2, communication conventionally involves at least the following steps. First, the application 58 invokes a send command in step 99. An example way for an application 58 to invoke a send operation is by executing a command as depicted by the "send" command 67. The command includes an an identifier (ID) which is used in part to identify the receiver, a source address from which message data will be taken and a size, indicating the amount of data to be sent. The operating system then copies the message in step 100 from application memory, such as an endpoint 66, to message buffers, e.g., 62, in the operating system 56 of sender 50. This step is often optimized by mapping locations in the application memory to locations in the message buffer 62 to avoid actual copying. The operating system 56 then performs protocol processing if necessary in step 102. That is, the data to be sent is placed into the proper format as may be required by the network 82. The message, or perhaps several messages if the amount of data is large, is then injected in step 104 into the network 82 through network interface 84.

Usually, message arrival at the receiver causes an interrupt to the processor 70, and the operating system 72 directly extracts the message in step 106 from the network (meaning network and network interface) and copies it into message buffer 74 in the operating system. Alternatively, in a system with appropriate hardware, the operating system may set up a direct memory access (DMA) with the network interface to extract and copy the message to message buffer 74.

In some communication schemes an intelligent network interface, or perhaps a second processor at the receiver 52 (e.g., the communication co-processor in the Intel Paragon) extracts the message from the network 82 and copies the message to the message buffer 74. The operating system 72 then performs protocol processing, if necessary, in step 108, then copies the message in step 110 from the message buffer 72 at the receiver 52 to application memory such as endpoint 79. Usually the operating system 72 copies this data to application memory in response to an explicit receive request by an application, such as a "receive" command 77. The command includes an ID' which is used in part to specify the message buffer, e.g., 74, from which data is to be received, the receive address to which the message should be copied, and a size indicating the amount of data. It is also possible for the operating system 72 to automatically copy the data according to some previously saved state information. As in the sending side, this copying is often optimized by mapping locations in the application memory to locations in message buffer 74 to avoid actual copying.

A communication system has overhead which includes both communication latency and impact on the processors 54 and 70 of the sender 50 and receiver 52. For sake of simplicity, communication latency and communication overhead are referred to herein merely as latency and overhead. Latency may be defined as an amount of time taken for a message to be transferred from application memory at the sender 50, such as endpoint 66, to application memory at the receiver 52, such as endpoint 79. Impact on the processor involves interrupt handling, data flow control and protocol processing. Overhead is reduced by optimizing the steps described above in connection with FIG. 2 so as to reduce latency and impact on the host processor.

Low overhead is important for applications which require rapid response behavior, such as parallel and distributed computing systems and real-time control systems. In parallel computing systems, low latency is essential to reduce the amount of time a process at a sender 50 waits for data to be read from a remote memory location, e.g., application memory 79, and for remote synchronization operations (e.g., obtaining and releasing locks) to be completed. In distributed computing systems, performance of a client-server model is often limited by the amount of time required to do a remote procedure call (RPC), which is affected by latency. The importance of low latency is perhaps most obvious in real-time systems where an inordinate delay in communicating a control input may lead to disaster.

Even when low latency is not essential for a given application, it may increase the spectrum of possible applications and the flexibility in structuring a system. In parallel computing systems, lower latency enables the efficient exploitation of more finely grained computations and thus increased parallelism. In a distributed computing system, sufficiently low latency may make paging, e.g. by sender 50, over a network 82 to memory in a remote node, e.g. receiver 52, faster than paging to a local disk (not shown). Finally, low latency could help make client-server based computing systems attractive for realizing flexible real-time computing systems.

Low impact on the host processor is important to minimize the degradation on applications due to reduced and unpredictable processor availability. Predictability is particularly important for real-time tasks performed by the host processor. It is important to insulate such applications from unrelated asynchronous network events.

Current generation parallel computing systems with proprietary networks obtain latencies in the range of 1 μsec to 100 μsec. It is desirable to have latency in a local-area network be no more than 1000 cycles, which for future 1 GHz processors, is 1 μsec. In conventional 10 Mbps Ethernet LANs, latency is typically about 1 msec. First generation 100 Mbps ATM networks can achieve about 250 μsec latency using conventional network protocols and interfaces. Because increasing the speed of a network does not necessarily reduce latency, to achieve lower latencies improvements are needed in the operating system, the network interface and the network protocol.

The conventional approach will now be described in more detail in order to identify the obstacles to obtaining low overhead communication. Conventional communication systems in both distributed systems (e.g., TCP/IP implementations) and parallel computing machines (e.g., the Intel Paragon) are oriented towards bulk and stream data. In such systems, messages, often large in size, include a buffer identifier (ID) and data. A combination of interface hardware and operating system software demultiplexes arriving messages via the buffer ID into sequential positions in the identified message buffer, e.g., 74 in FIG. 1.

In almost all cases, the network interface generates an interrupt to the host processor. The operating system then either directly copies data from the network interface to a message buffer 74 within the operating system or sets up a DMA transfer which accomplishes this message copy.

Because this message buffer 74 is within the operating system 72 as described earlier, the operating system 72 at the receiver 52 must copy the data from the message buffer 74 to application memory, such as endpoint 79. One way to eliminate the copying overhead of such buffering is to map the application memory of endpoint 74 to the message buffer 72. Alternatively, the data could be copied directly to application memory from the network interface.

Regardless of the implementation method, messages are really only demultiplexed to sequential locations in either the message buffers in the operating system or in the application memory (if copied there directly from the network interface): the position at which a message is stored within a message buffer is determined implicitly, e.g., by sequencing a pointer. Also, typically, every message received causes an interrupt to the processor and operating system at the receiver to extract the message from the network to the message buffer. Because the sender has no direct control over either the final address of a message, or the interrupt status of the receiver on receiving the message, this form of message handling is appropriately called receiver-based addressing.

It is common with such a conventional network protocol to multiplex application and message processing on a single processor. However, this multiplexing introduces significant overhead, because many cycles are required to handle an interrupt. First, a trap into the kernel is made, then many cycles are used to demultiplex the interrupt. Finally, an interrupt handler is executed. This multiplexing overhead both incurs delay in message delivery and temporarily postpones application processing at the receiver. The unpredictable nature of application interrupts caused by asynchronous message arrival is a problem for real-time systems. Frequent interrupts also degrade application performance.

Addressing in early multicomputers such as the Intel iPSC used such an approach: the operating system kernel at the receiver demultiplexed messages to message buffers and the application demultiplexed the buffer contents to application memory. Kernel involvement remains state of the art in the parallel workstation area, such as the SP1 developed by International Business Machines. An alternative solution used with some conventional communication protocols is to add another full processor as a communication co-processor, such as on the Intel Paragon, which is used to handle asynchronous message arrivals. Such a communication co-processor is also useful for handling complicated gather-scatter operations, which arise when large messages are used. Since this co-processor duplicates hardware, it is expensive.

Instead of devoting significant resources and complexity at the receiver, like the co-processor approach, to determine where to deposit and how to handle messages, the sender can do this determination. Such a known, though less conventional approach for a communication system is shown in the block diagram in FIG. 3. In this system, a sender 87 and receiver 88 are connected by network 82 via network interfaces 89 and 90. The respective operating systems 91 and 92 need not have message buffers. In this system, the sender specifies where a message will be deposited in the receiver. As indicated by the example command 95 in FIG. 3, the "send" command now also indicates where the message is to be deposited in the receiver, i.e., by including the "receive address". Thus, a message such as 94 sent from the sender 87 to the receiver 88 includes not only header and data information but also the address at the receiver 88 into which the message 94 will be placed. The sender may also directly specify whether an interrupt is to be generated upon message arrival at the receiver.

Figure 3:
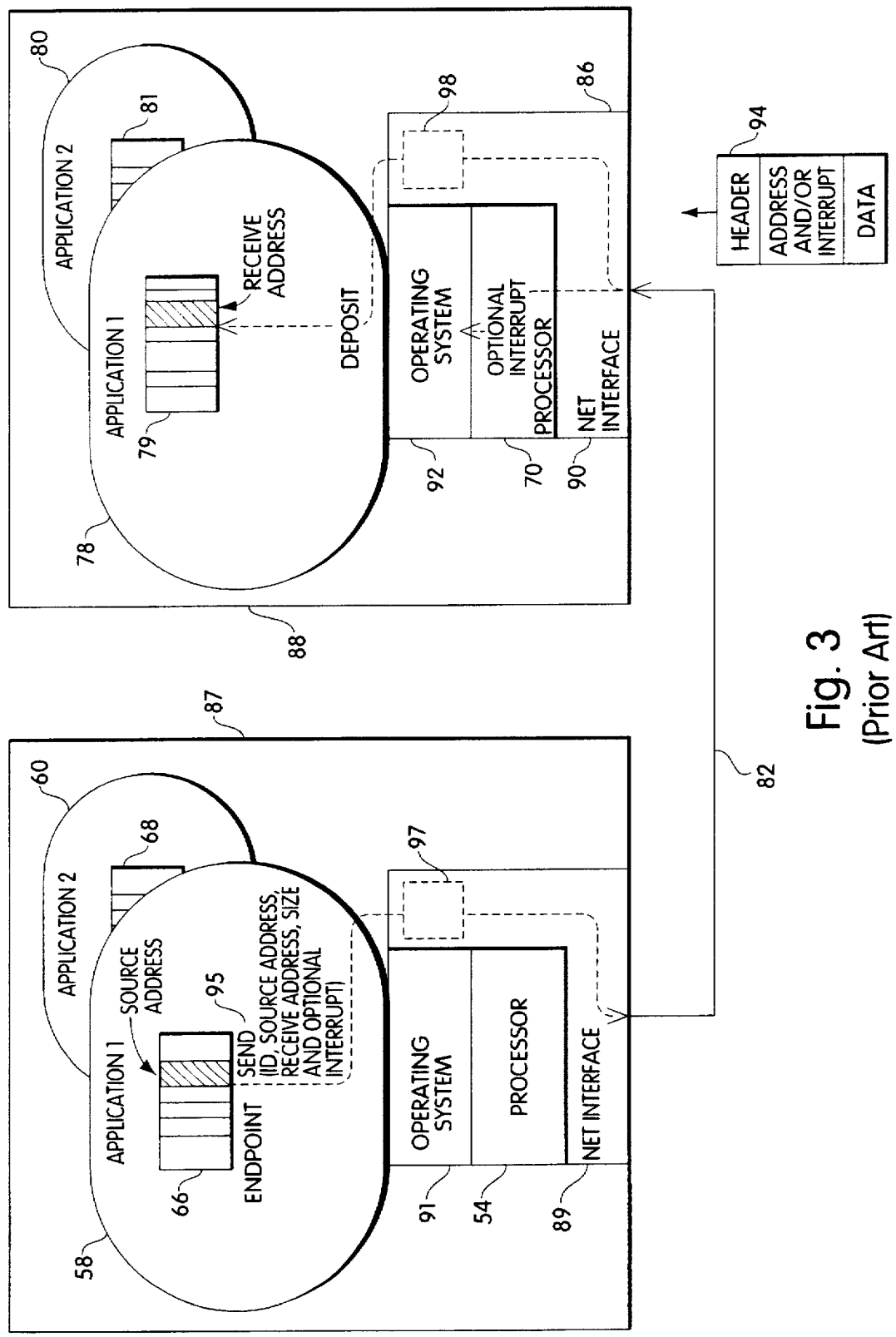
FIG. 3 is a block diagram of a conventional computer system with a communication system using sender-based addressing.
Figure 4:
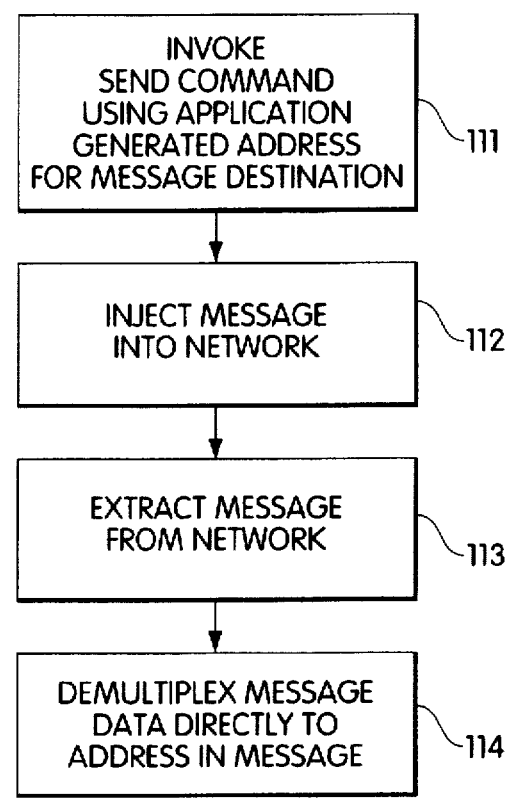
FIG. 4 is a flow chart describing the operation of the computer system of FIG. 3.

FIG. 4 is a flow chart describing the general operation of the system of FIG. 3. First, the sender determines an address where the message is to be deposited at the receiver. The sender invokes the send command in step 111 with this address. The message is then injected into the network in step 112 directly from the application memory, in contrast to the conventional system shown in FIG. 2 which injects a message from an operating system level message buffer. Next, the message is then extracted in step 113 and from the network interface, the message is demultiplexed directly into the receive address in the message (step 114). Again, this is in contrast to the conventional network system which extracts it to an operating system level message buffer.

In this system, copying of message data from application memory to and from operation system message buffers (steps 100 and 110 of FIG. 2) is omitted. Rather, a message is copied directly from application memory in the sender to application memory in the receiver. Interrupts to the processor may or may not be indicated by the message. The interrupt state is solely dependent on the specification by the sender. Various realizations of such a system differ in the presence, amount, and details of protection, as indicated by 97, 98 in FIG. 3.

Such a network protocol and interface has been used primarily for parallel machines, such as the Tera 3D available from Cray Research, Inc., of Minnesota, and the Stanford University DASH machine. Such a parallel machine with a global address space uses a message, usually small in size (e.g., word or cache block), which carries both an address and data. The data is stored directly in the receiver address contained in the message. With this method, demultiplexing at the receiver is trivial; the sender specifies all the information. Consequently, this form of message handling is called sender-based addressing. The analogous term "sender-based interrupts" is used to describe the interrupt generation.

Because such a parallel machine is often assumed to have a single user, or multiple users interacting benevolently, protection issues are often not addressed in their internal network systems which are used exclusively for interconnecting parallel processors. That is, protection 97, 98 in FIG. 3 are often omitted.

Figure 5:
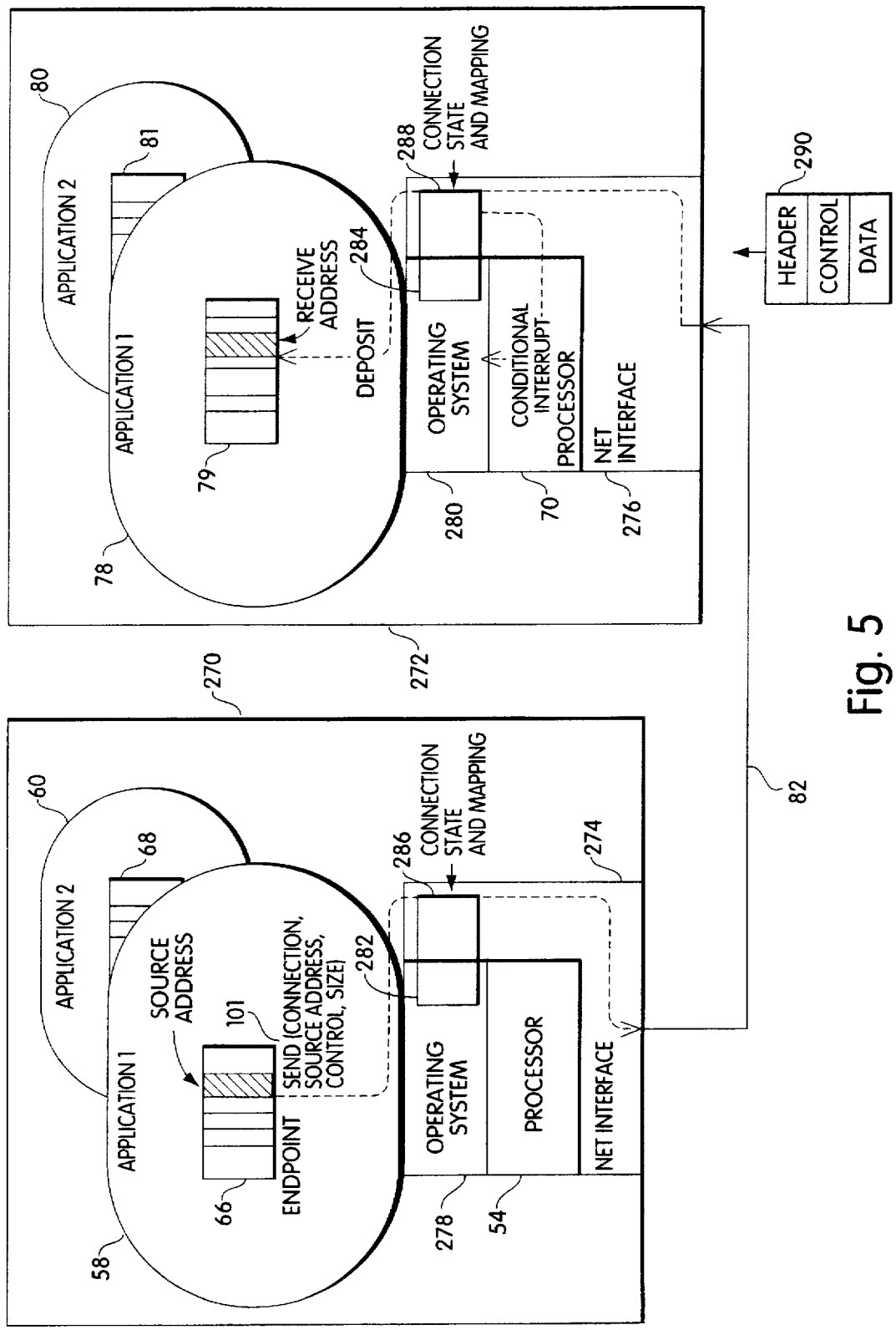
FIG. 5 is a block diagram of a computer system with a communication system in accordance with the invention using direct deposit messaging.

This invention overcomes problems in the prior art by directly depositing messages where they are required. FIG. 5 is a block diagram of a communication system in accordance with the invention. It includes a sender computer 270 and receiver computer 272 interconnected by a network 82 via network interfaces 274 and 276. The sender and receiver computers 270, 272 each have respective processors 54 and 70 programmed according to a desired operating system 278 and 280. For the purposes of illustration, the terms endpoint and connection will be used. These terms should not be construed to limit the invention, as the invention is applicable to many types of computer networks. As used herein, an endpoint signifies a contiguous region of virtual memory. A connection is a virtual channel authorizing communication between a pair of endpoints. A connection may also be multi-cast, i.e., not restricted to pairs of endpoints. Applications 58 and 60 being executed on the sender 270 and applications 78 and 80 being executed on receiver 272 each have one or more endpoints assigned to them, e.g. respectively 66, 68, 79 and 81. Each of the operating systems 278 and 280 store connection state and mapping information 282 and 284 respectively, which are indicative of the states of the sender 270 and receiver 272. This information preferably is cached in the network interfaces 274 and 276 as indicated at 286 and 288.

A message 290 sent from the sender 270 to the receiver 272 includes both control information and data. The control information may include an indication of an action to be performed, one or more operands indicative of a state of the sender and one or more references to information stored at the receiver. This information stored at the receiver may also be called state maintained by the receiver or receiver state.

Figure 6:
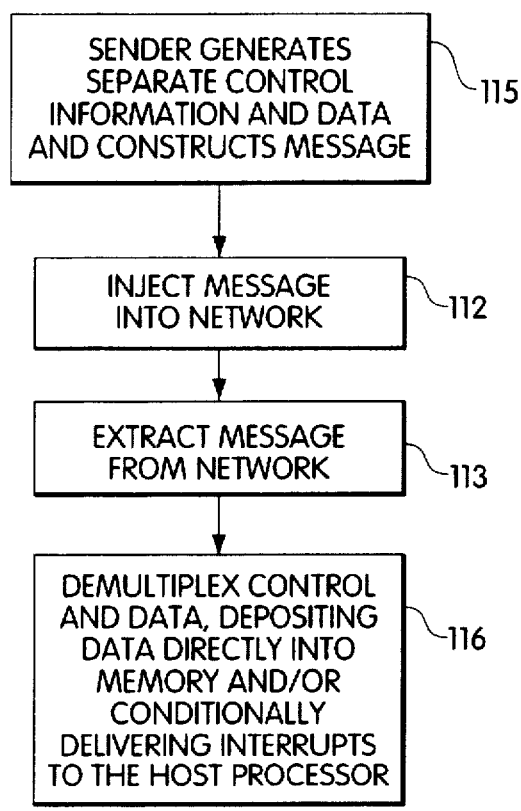
FIG. 6 is a flow chart describing the operation of the computer system of FIG. 5.

FIG. 6 is a flow chart describing generally the operation of the system shown in FIG. 5. The sender first generates separate control information and data and constructs a message in step 115. As indicated by the example command 101 in FIG. 5, the "send" command includes an identifier of a connection, an address from which data is to be taken, control information and an indication of the amount of data to be sent.

This message is injected directly from application memory into the network in step 112. Next, the message is extracted from the network into the network interface in step 113. In step 116, the network interface demultiplexes the message, depositing data directly into memory and/or conditionally delivering interrupts to the processor.

A message originating at a source endpoint bypasses the operating system and host processor at the sender. At the receiver, the operand may be compared to connection state information to determine whether an interrupt should conditionally be delivered to the processor 70 and the receiver 272. Also, these operands may be combined with connection, state and mapping information to determine the address in memory in 79, for example, to deposit the message data.

Thus, in this invention, copying of message data from operating system message buffers to application memory is omitted. Furthermore, interrupts are conditionally generated according to both sender state and receiver state. Also, an address into which message data is deposited is determined in part by sender state and in part by receiver state. Thus, the sender may be isolated from too much knowledge of the reciever.

This system is generally based on the observation that message sending is simple, whereas message reception is complex because of the asynchronous nature of message receiving. Message handling at a receiver should therefore be separated into message delivery and message action. This separation allows control of asynchronous events, wherein events are distinguished by their need for the host processor at the receiver. Events, such as message delivery, which do not require the host processor are handled directly. Other events, chiefly synchronization, that require interaction with the host processor are further divided into actions that require immediate service and actions that can be delayed and accumulated and processed at some time convenient for the host processor, thereby turning them into synchronous events. With this separation of data and control events, resources sufficient to bypass the non-host processor events, rather than all events, is all that is required.

Message delivery simply involves depositing a message in a desired location in the memory of the receiver, e.g., by a remote write or a direct memory access (DMA). Message action is taking some action in response to reception of a message, such as returning a value, performing a read operation, notifying a task that the data has arrived, enabling a task on the scheduler queue, which is a data structure indicating tasks eligible to be executed by the processor, or invoking an arbitrary interrupt handler, e.g., a remote procedure call (RPC).

Whether an action is immediate or delayed depends on 1) when a remote process awaiting the result of the action (if any), hereafter called the waiting task (not always the sender), needs the response, and 2) the priority of the action relative to the priority of other activities at the receiver. Some examples of immediate actions are a read or synchronization operation where the waiting task needs the result to proceed, and a high priority control operation, such as some operating system action. Some examples of common delayed actions are notifying a task that data has arrived and enabling a task on a scheduler queue. The related message may also be refereed to as not requiring immediate action.

In many cases, a system may be structured so that an immediate response is not necessary. For example, a remote node may execute another task while it awaits a response from a message action. Of course, if a message is destined for a waiting task which is not currently active anyway, e.g., notifying an inactive process that data has arrived, any action in response to that message may be delayed. When an action may be delayed, the message may be queued for processing at a later, more convenient time for the receiver. Thus, a message for which an action may be delayed becomes a synchronous event. Conveniently, queuing a message is merely message sending and a queue pointer update.

To implement this kind of protocol, herein called direct deposit messaging, a message contains the connection, which is an identifier which implicitly identifies the receiver endpoint, control information indicating both an action to be performed and one or more operands, and data. Each operand may be an address to be used by the receiver, and/or may be a parameter used to determine whether the specified action must be performed immediately or may be delayed, and/or may name some receiver state. Addresses are encoded as an offset from the base of the endpoint. The offset is essentially a network logical address that insulates the sender and receiver from the addressing details, e.g. address space size, virtual to physical mappings, and page size, at the other. This separation promotes modularity and accommodates node heterogenity. Furthermore, an offset typically does not need the full dynamic range of a virtual or physical address and thus can be encoded in fewer bits within a message.

A set of primitive actions, representing common operations that may be implemented simply without host processor or operating system intervention, is provided. More complex actions are left to the host processor. The primitive actions described herein are simple data transfer, i.e., read and write to endpoint locations and conditional interrupts to the host processor for delayable or immediate actions.

The simplest operations are pure sender-based direct read and write data transfers. For a direct write, the sender specifies the source data by its offset from the base of the source endpoint and the receiver location by the offset from the base of the receiver endpoint. Messages contain the receiver offset and the data. For reads, the source sends a message with a direct write request to the receiver, along with the offset in the receiver and the deposit offset (for the reply) in the source, and an indication of a reply connection if the connection is not duplex.

To enable actions which are a function of both sender and receiver state, the receiver end of each connection maintains some state, i.e., stores some information which message operands may name and so obtain receiver addresses. To simplify matters, this state is contained in specially addressable locations which herein are called "address registers". This state could also be held in general memory locations. Thus, message actions are a function of an operation specified by the sender, operands representing sender state, and receiver state, such as the contents of the address registers.

The following is an example set of primitive operations using sender and receiver state.

Address Generation
1. Direct addressing: effaddr=operand
2. Indirect addressing: effaddr=<addreg$_i$>
3. Indexed addressing: effaddr=<<addreg$_i$>+operand>

Register operations
1. addreg$_i$←operand
2. addreg$_i$←unary-op <addreg$_j$>
3. addreg$_i$←<addreg$_j$> binary-op <addreg$_j$> where i and j are not necessarily different Conditional operations
1. if (<addreg$_i$> compare-op operand) then generate interrupt at end
2. if (<addreg$_i$> compare-op <addreg$_j$>) then generate interrupt at end where i and j are not necessarily different Some form of address generation unit calculates an effective address (effaddr) at which to read or write data. <X> denotes the contents of memory location X. "Operand" may be data or other operand in a message. The message operation controls whether a read or write occurs to memory, the primitives selected, and their order. The conditional test may occur at any time but the interrupt preferably occurs at the end of the compound operation.

These primitive operations allow a rich set of powerful and flexible compound operations. For example, an indirect write with postincrement can be synthesized with an indirection followed by a register operation:
<addreg$_i$>←MSG
addreg$_i$←<addreg$_i$>+operand
The last step may also be: addreg$_i$←<addreg$_i$>+<addreg$_j$>
Done on a per-cell basis, this compound operation is equivalent to DMA with stride equal to the increment value. However, note that varying operand or <addreg$_j$> yields variable strides.

As another example, priority queueing and interrupts can be synthesized as follows:
<addreg$_i$>←MSG
addreg$_p$←<addreg$_p$>+<addreg$_s$>
if (operand greater than <addreg$_i$>) generate interrupt at end
addreg$_i$←<addreg$_i$> bitwise-or operand
where "operand" indicates the priority of the message, addreg$_p$ points to the end of the queue to which a message of this priority should be added, addreg$_s$ contains the size of MSG, and addreg$_i$ holds the priority level at the receiver where p, i and s are different from each other. The message specifies the operand and register indices p, i, and s.

Complex compound operations like this priority queueing may require multiple compound operations. For example, two compound operation messages would be required in this case if the receiver executes one register operation per message.

As a final example, sometimes it may be convenient to append messages to one of several different queues without generating interrupts and maintain a bit vector of non-empty queues. This mechanism can be implemented in generally the same way as priority-based interrupts, but with the most significant bit of addreg$_i$ set to block interrupts. This implementation assumes both unsigned comparison and fewer queues than bits in addreg$_i$. This second assumption could be relaxed by using multiple address registers. Messages may also be appended to a queue within a specialized endpoint within the operating system, enabling delayed actions involving the operating system.

As other examples, various atomic operations such fetch-and-increment, read-modify-write, and compare-and-swap can be implemented by devoting one or more of the address registers for the target location and using the register operations for incrementing and comparing. Barrier synchronization can also be implemented this way. When a process reaches a barrier point, it toggles a bit in a specified address register of all processes in the "barrier set" and then waits for a conditional interrupt when all the bits are set (or cleared).

This protocol provides at least the following benefits. First, the combination of sender state, receiver state, and operations on the two is very powerful. The full superset of capabilities of both conventional, receiver-based addressing, and sender-based addressing is possible. The mix of sender and receiver information can be varied on a per message basis to accommodate different requirements on what the sender knows, or alternatively, different requirements on the isolation of knowledge between sender and receiver. Indirection provides protection by isolating the sender from too much knowledge of the receiver because the actual storage address is partially a function of an address the sender may not know. Similarly, the interrupt status is partially a function of receiver information contributed (via messages) by processes that the sender may not know exist. As will be described below, a mechanism may also be provided for register protection that prevents a sender from accessing by read or write or otherwise determining or modifying the contents of specified receiver state, such as address registers.

Second, predictability of computation, which is important in real-time systems, is increased by restricting control flow interrupts to well-defined points. In effect, the asynchronism and nondeterminism is eliminated from asynchronous network events.

Third, action handling is more efficient and results in less overhead because interrupt overhead is amortized over multiple actions. Polling can be used to synthesize hybrid interrupt-polling action methods.

Finally, more complex operations can be formed by combining the result of multiple compound message operations.

This protocol is preferably endpoint and connection based. Endpoints and connections are allocated and deallocated with kernel calls. Preferably, endpoints are page-aligned. Thus, host virtual memory page protection is also used within endpoints. A connection may be established between any pair of endpoints, including endpoints on the same node. The connection establishment protocol is much like session establishment in Berkeley UNIX sockets. Some out of band mechanism, such as a boot-time agreed upon kernel endpoint and connection, is used to arrange allocation of the endpoint and connection in the receiver.

An endpoint may have multiple originating connections and/or multiple terminating connections. Connections can be simplex, duplex, or multicast. Connections originating from or terminating on an endpoint all share the same mapping information. However endpoints can be overlapped or nested to form more complicated protection patterns. For example, connection A could create an endpoint with virtual address bounds (v$_l$, v$_u$). Then connection B could create a second endpoint that is a proper subset of this range to allow connection A access to all of B, but B to only access a portion of A. Or, connection B could create an endpoint that partially overlaps with A's ($v_l$, $v_u$) range to allow connection A and B a limited range in which to share without exposing their entire respective endpoints to the other. Different protection schemes can also be realized by mapping the physical pages of an endpoint to virtual address ranges with different page protection.

Network protection is provided as follows. Access to the network via out-going connections is controlled by per-connection state maintained by the kernel. Messages arriving from the network check for authorization with the receiver connection state maintained by the receiver kernel. Authorization to receive a message from an incoming connection implicitly authorizes the message to write in the associated endpoint. However, the receiver address must still map to a legitimate endpoint address and the operation must be permitted by per-page access rights.

Protection can also be provided in such a system by having the receiver verify that the operation requested and the address used at the receiver are legitimate. For example, a memory region can be specified for each application. If the address to which data is written is not in the specified region, access is denied.

An implementation of this system, specialized to ATM networks, will now be described. It should be understood that the following is just an example, and that the invention may be implemented for other networks and in different ways.

Figure 7:
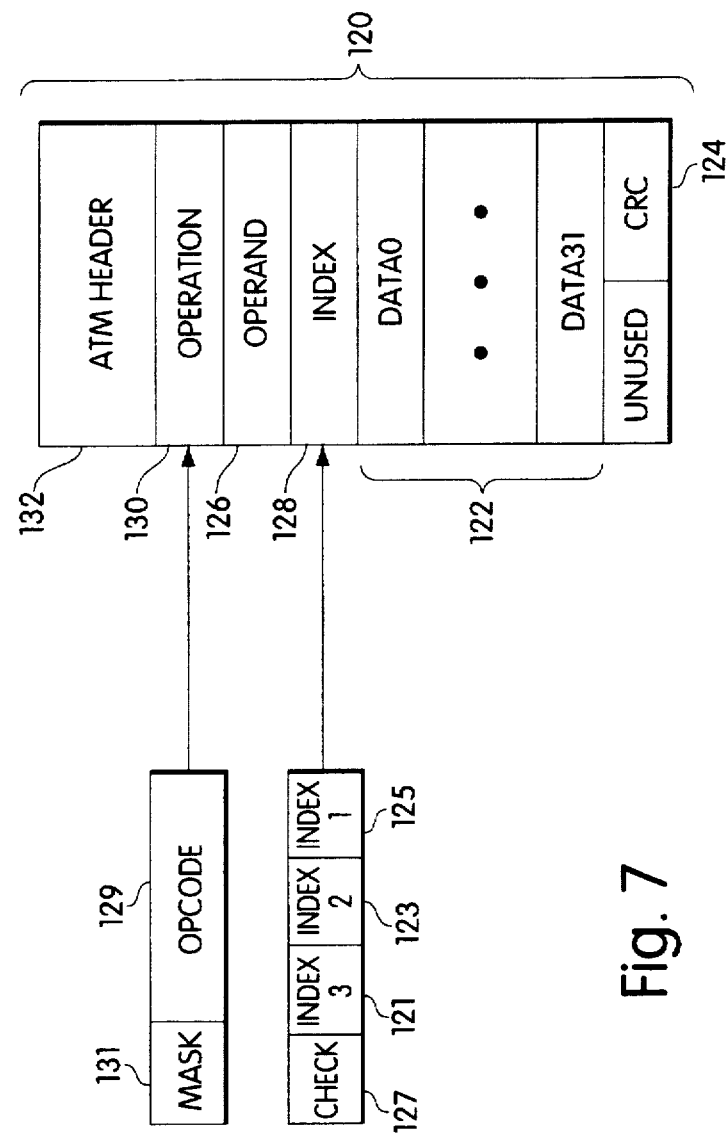
FIG. 7 is a block diagram describing a suitable format for a 53 byte ATM cell to be used in one embodiment of this invention.

FIG. 7 shows one possible format of a 53 byte ATM cell 120 for this implementation. In the simplest format, a cell includes data and control information along with the standard network header and other information The sizes of the data fields in this format are merely exemplary and are not intended to be limiting.

In FIG. 7, an ATM header field 132 contains link routing, which indirectly identifies the receiver, and traffic control information. This field is five bytes and is in a format suitable for processing by a standard ATM switch. The connection number is encoded in a virtual channel/virtual path identifier (VCI/VPI) field (not shown) in this header.

There are also a field of 32 bytes of data 122 and 16 bytes of control data (discussed below) per cell 120. The data field size matches memory and cache block sizes of 32 bytes and thus enables fast, efficient hardware implementations. Data masks can be used to eliminate unwanted message data at the receiver, as explained shortly.

A cyclic redundancy check (CRC) field 124 of two bytes may also be provided, to correspond to the data field 122, at the end of the cell 120, to help prevent an errant message from being interpreted as a valid message. Two other bytes are unused.

The control information includes a four-byte operation field 130 which specifies the type of operation to be performed at the receiver. This operation field of 130 may include a mask field 131 and opcode field 129. The opcode field specifies the operation, whereas the mask field can be used to deselect the reading or writing of four byte words within a block of the data field 122. That is, bit i in the mask controls whether data word i is read or written. This feature is useful to update a location without changing the values (e.g., variables) in neighboring locations in a block. A four-byte operand field 126 is also provided. The operand is a 32 bit immediate source operand (offset or data). Destination operands are specified via three separate register indices encoded in a four-byte index field 128. These separate index fields are shown at 121, 123 and 125. The check field 127 contains a simple check sum over the prior control fields so that decoding of the control can begin without waiting for the entire cell to arrive.

For a read request to a remote node, the data field 122 contains the control field for the reply write message. There is also a multiple cell message format for block transfer. In this format, the first cell is a "control" cell in the write format shown in FIG. 7, and the following cells are standard AAL5 (ATM Adaption Layer 5, an ATM signaling standard) cells. To avoid complexity with cell boundaries and length and CRC in the last AAL5 cell, all block transfers are multiples of 16 bytes.

As mentioned above, the direct deposit model of communication herein described is endpoint and connection-based: an application allocates endpoints, sets up connections between the endpoints, and then sends messages over these connections. To support such operation with the direct deposit model of communication herein described, the operating system at each node maintains the following data structures. However, a hardware implementation may cache some or all of these data structures to support high speed operation, as will be described in more detail below in connection with FIG. 9.

An endpoint table includes an entry for each endpoint at that node (e.g., sender 50), indexed by an endpoint number. Each entry in this table contains indications of a base memory address for the endpoint, e.g. in memory 79 or 81 at the receiver 52, endpoint size, virtual to physical mapping information, access information, e.g., private, read only or shared, all open connections to the endpoint, and any processes attached to the endpoint.

A connection table includes an entry for each connection originating or terminating at that node, indexed by the connection number. Each entry in this table contains an indication of an endpoint number, address register base and bounds, connection state information, and reply connection information.

A node address table is also used. Each entry for a node includes the name of a remote node and the connection number for a connection (direct or indirect) to the operating system of the remote node. The index to the table is a unique global identifier for each node. This table is used to contact remote nodes for connection set up. This table may also contain naming information via some alternative signalling mechanism, such as Internet-protocol (IP) addresses.

Data are delivered to endpoints and interrupts are delivered to the operating system. Specifically, data are delivered to the endpoint at the receiver of a specified connection and not to processes which may be attached to the endpoints. Interrupts are delivered to the operating system running on the receiver and not to specified processes. The operating system may then deliver interrupts to specified processes.

Figure 12:
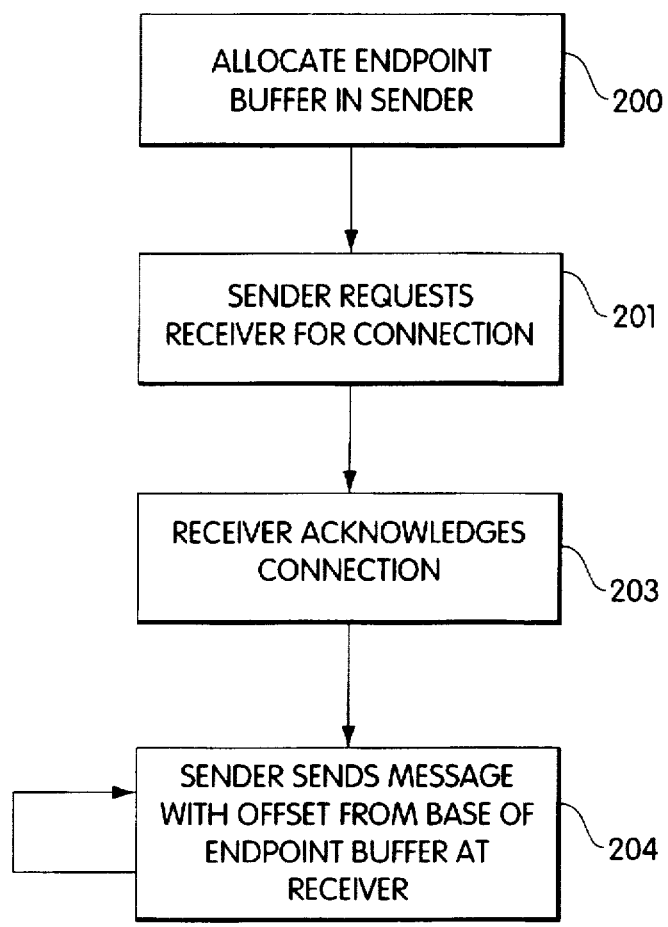
FIG. 12 is a flowchart describing how an endpoint and connection based communication is established.

Operation setup for such a system will be described in connection with the flowchart of FIG. 12. The sender 50 first allocates an endpoint in its virtual address space in step 200. A free slot is found or made in the endpoint table and is filled with the base address of the endpoint, and virtual to physical mapping information.

Then, via an alternate connection, perhaps a dedicated operating system connection or an alternate network like a transport control protocol/internet protocol (TCP/IP connection, in step 201 the sender contacts the intended receiver and requests a connection be setup with an appropriate endpoint buffer size. The receiver then allocates that size buffer region in its virtual address space, finds or makes a free slot in the endpoint table, and fills it with the buffer base address, and virtual to physical mapping information.

The receiver then acknowledges the connection in step 203. In a multicast connection, this procedure is repeated for each sender-receiver pair in the multicast. Messages containing an offset from the base of the endpoint may then be sent over the connection in step 204.

This protocol can be implemented without special-purpose hardware using a computer program on a commercially available computer and network interface. Such an implementation has been made using two DECStation 5000/240 workstations, available from Digital Equipment Corporation. Each workstation had a Fore Systems TCA-100 ATM network interface plugged into its "TURBOchannel" I/O bus and the two workstations were connected back to back, i.e., without an ATM switch. The DECStation 5000/240s had a 40 MHz MIPS R3000 processor, 64 Kbyte direct mapped off-chip instruction and data caches, and 32 Mbytes of main memory. The main memory and I/O subsystems, including the 32-bit wide TURBOchannel, operated at 25 MHz. The Fore TCA-100 was a very simple interface containing two FIFO queues, one for transmit and one for receive, and some control and status registers. An ATM cell was transmitted by the processor writing fourteen 32-bit words representing the 5 bytes of ATM header, 48 bytes of ATM payload, and 3 bytes of padding over the TURBOchannel to the TCA-100 interface. An ATM cell was received by the processor reading fourteen 32-bit words. Although the TURBOchannel supported DMA, the TCA-100 did not use it. The TCA-100 either generated a TURBOchannel interrupt when a cell arrived or a receive cell counter on the TCA-100 was polled to determine if any cells have arrived. The data rate over the fiber connecting the TCA-100s was 140 Mbps. The DECStations ran the Carnegie-Mellon University (CMU) microkernel-based operating system Mach 3.0 (MK83, UX41), for which full source code is readily available, including full source code, from CMU of Pittsburgh, Pennsylvania.

A simple remote write function was implemented on this system for experimentation purposes. In this implementation, a 32 byte block of data at a given offset from a endpoint in the sender was delivered to a sender supplied offset in a sender named endpoint in the receiver. The data, offset, and buffer information were packed into a single cell. The data block size was 32 bytes, for agreement with cache block sizes, restricting the offsets to be 32 byte, block aligned for implementation ease.

The low level Mach kernel exception handling code was also modified to send a cell via an illegal instruction trap. On the receiving side, the Mach microkernel was modified to partly optimize the interrupt path. In particular, the TCA-100 handler was called directly from the kernel interrupt trap handler.

Using the implementation described above, the following experiment was performed. From user level a previously stored block of data was sent from the source workstation to the receiver. A user level process at the receiver was running, testing the endpoint area for the arrival of the data. Once the data arrived, the receiver process sent it back to the source workstation where another user level process was running, testing for the arrival of the data. The total round trip time was then measured. This includes two one way remote writes, loop overhead, since the round trip was repeated twenty times, and measurement overhead. The results are listed in Table 1, below.

TABLE 1

| Remote write latency | | |
|---|---|---|
| | First iteration | Average best |
| Average send overhead | 25 μsec | 3.4 μsec |
| Average send to receive | >1 msec | 49.1 μsec |

The first row is the average time to send a cell via the illegal instruction trap send. The second row is the round trip send-to-receive time corrected for loop and measurement overheads. The first iteration column lists the time on the first iteration, and the average best column lists the average of the times on 19 following iterations. After the first two iterations typically there was very little variation in the times.

The first iteration incurs cache and translation-lookaside-buffer (TLB) misses which causes the send-to-receive time of this iteration to be much greater than that of subsequent iterations. (However, it is not clear why the send to receive time is so large on the first iteration. The first iteration send overhead is much more reasonable). After all cache and TLB misses and other transients have dissipated, the round trip time was 49.1 μsec, which means that the best case one-way send-to-receive time for a remote write was about 24.5 μsec, which is about 80 times faster than a similar test using Fore System's AAL3/4 implementation on the same hardware running Ultrix 4.3.

The bandwidth was measured by sending a sequence of consecutive remote writes as found below in Table 2.

TABLE 2

| Bandwidth achieved with remote write blocks | |
|---|---|
| Block size | Bandwidth |
| 10 | 19 Mbps |
| 20 | 22 Mbps |
| 40 | 24 Mbps |

The block size is the number of consecutive remote writes.

The bandwidth increases as the block size increases since the interrupt overhead is amortized over more data. The TCA-100 interrupt handler reads cells until the receive FIFO empties. Thus if cells are sent sufficiently close together, only one interrupt, and hence one path through the interrupt trap handler, may be required to read all the cells. Since sending a cell was fast with the illegal instruction trap method, this amortization effect is easily obtained, even when consecutive blocks are sent using an ordinary "for" loop. The asymptotic bandwidth achieved is thus a measure of the per cell overhead in processing a cell from the receive FIFO.

The 24 Mbps bandwidth is based on 32 data bytes per cell. Using the same hardware, others have reported a peak bandwidth of about 48 Mbps using the 44 data bytes per cell AAL3/4 format. This cell rate translates into a peak bandwidth of about 35 Mbps using 32 data bytes per cell. Thus the partly optimized single cell remote write implementation described above is obtaining about 68% of the practical peak bandwidth that can be obtained with 32 data bytes per cell. Even so, the 24 Mbps bandwidth is significantly better than the 14 Mbps peak bandwidth measured for Fore System's AAL3/4 implementation with the same hardware running Ultrix 4.3.

The 24 μsec latency reported above breaks into the components shown in Table 3.

TABLE 3

| Latency breakdown | |
| --- | --- |
| TURBOchannel time | 7 μsec |
| ATM cell time | 3 μsec |
| CPU and memory time | 14 μsec |

Since the TCA-100 ATM interface does not have DMA, all accesses to the interface to send and receive cells use programmed I/O. Programmed I/O is slow on the TURBOchannel, resulting in nearly one third of the latency. The ATM cell time refers to the time for 53 bytes (one cell) to completely collect at the receiver at the 140 Mbps data transfer rate used by the fiber connection. The remainder of the 24 μsec (14 μsec) is, of course, the CPU and memory time at the sender and receiver, and is 68% of the total latency. Consequently, optimizing the interrupt handler code by 20% will only reduce the total latency by about three μsec. Thus, although there may be room for optimization in the current implementation, only diminishing returns would be obtained. Thus, it is probably fair to conclude that approximately 20 μsec is the minimum latency for remote write with this common commercially-available hardware.

In view of these experimental results, special-purpose hardware should be added for protection and for direct depositing of data in memory to reduce the load on the processor, and to reduce memory and I/O bus time. This hardware support should reduce the end to end latency to close to single cell time: 2.7 μsec at a data rate of 155 Mbps, and 0.68 μsec at a data rate of 622 Mbps. The reduced load on the processor could also be important for a server, such as file server, in a distributed system that has a heavy communication load. Also, variation in latency is also reduced and even the worse case latency can be good.

Such an implementation in hardware of an architecture of a network interface for supporting communication in accordance with this invention will now be described. Because a node typically may act both as a receiver and sender, a network interface for a node should handle both sets of functions. The functionality of the receiver 52 will now be described and includes address mapping and protection, address registers, control for data and address paths, and flow control. The sender will be described below.

The implementation has two parts. The first part is a front end architecture for address mapping, address registers, and control mechanism functionality. This part has multiple possible embodiments, each having generally the same functionality. A general block diagram is provided in FIG. 8, of which multiple embodiments are described below. The second part, the back end which connects the network interface to the host memory, also has multiple possible embodiments. Three of these are also described below: a direct connection to the main memory, a traditional I/O bus connect, or a direct connection to the secondary cache.

Figure 8:
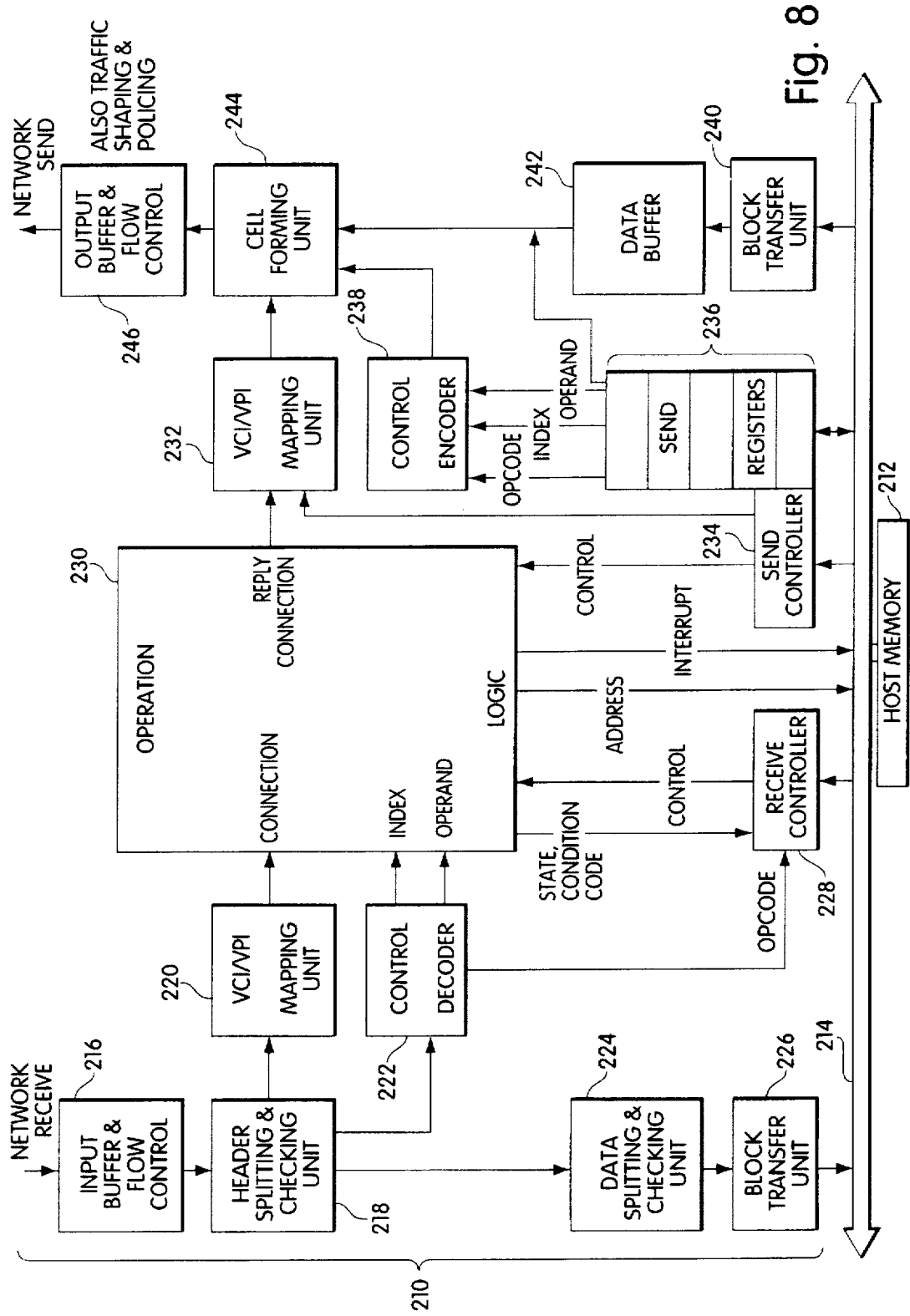
FIG. 8 is a block diagram describing one embodiment of the network interface in the communications system of the computer system of FIG. 5 for use in ATM networks with the cell format of FIG. 7.

The front end architecture will now be described in connection with FIG. 8. The front end of the network interface is shown generally at 210. The front end connects to the host memory 212 via a bus 214. The connection of 214 to host memory 212 is called the back end which will be discussed in more detail below. The front end 210, on the receive side, includes a receive buffer memory with flow control 216. This receive buffer is preferably a first-in, first-out (FIFO) memory element. A header splitting and checking unit 218 processes incoming cells and demultiplexes the information to VCI/VPI mapping unit 220, control decoder 222 and data splitting and checking unit 224.

The data splitting and checking unit passes blocks of data to block transfer unit 226, which can transfer data to the host memory across the back end 214. The VCI/VPI mapping unit 220 determines a connection number and applies it to operation logic 230. The operation logic will be described in more detail below in connection with FIG. 9.

Control decoder 222 decodes the control portion of the incoming cell and determines an index and operand which are provided to operation logic 230. The index and operand are the same values indicated in the ATM cell of FIG. 7. The control decoder 222 also outputs the opcode found in the ATM cell to a receive controller 228 which provides control information to the operation logic 230. The operation logic outputs, an address, state information, a condition code, a reply connection number and interrupts. The address and interrupts go to the back end 214 whereas a reply connection number goes to the VCI/VPI mapping unit 232 on the send side of the front end 210. Also on the send side of the front end 210 is send controller 234 which receives information from the host processor over bus 214 to provide control information to the operation logic 230 and a connection number to the VCI/VPI mapping unit 232. The send controller also includes send registers 236 from which opcode, operand and index information are provided to a control encoder 238 which forms this information into the control portion of the ATM cell described above in connection with FIG. 7.

A block transfer unit 240 on the send side processes data from the host memory into a data buffer 242. A cell forming unit 244 takes the connection information, control information, and data and forms a cell with appropriate header information which is then applied to a flow control and output buffer units 246. The output buffer is preferably a FIFO memory element. The message data may alternatively originate from data registers contained within the send register 236.

Aside from the receive and send controllers 228 and 234 and the operation logic 230, the remaining functional blocks are standard for network interfaces or are relatively simple in function. Thus, detailed description of these is omitted. The operational logic 230 and receive and send controllers 228 and 234, with a number of embodiments, will now be described.

The operation logic 230 of FIG. 8 will now be described in more detail in connection with FIG. 9. For ease of description and illustration, latches and control signals between elements in the figure have been omitted. The signals on the left-hand side of FIG. 9 come from the data fields in the ATM cell as described above in connection with FIG. 7. For example, a connection number (conn#) is derived from the VCI/VPI in the ATM cell header.

The operation logic 230 includes a connection table 140 which caches all or part of the connection table, described previously, which is stored by the operating system. Accordingly, for each connection, this connection table 140 contains an entry 142, which includes an endpoint number 146, address register information, including a base 148 and a bounds limit 149, and connection state information 150 and reply connection 151. The use of these fields will be described in more detail below.

An endpoint table 160 is also provided which caches all or part of the endpoint table, described previously, which is maintained by the operating system. Accordingly, for each endpoint, this endpoint table 160 contains an entry 162, indexed by endpoint number, which includes an indication of the base 164 of the endpoint, its bounds 166 and address mapping information 168. The address mapping information refers to a page map structure for that endpoint which is stored in host memory. This endpoint information is in a separate table so that multiple connections to the same endpoint can share the same information.

Address registers 170 are also provided. There are many options for implementing the address registers. Address registers are preferably private to each connection to limit problems with managing a possibly limited resource between competing activities. Any address within an endpoint could serve as a register for address indirection. Unfortunately, such generality causes access speed and protection problems. The speed problem is that a message with indirect addressing requires a first host memory access in the critical path to determine the location to store a message and a second host memory access with post-increment mode to store the updated index. The protection problem is that the indirection location can contain any address. The protection problem can be solved by translating this address, but then two address translations are required in the critical path—one to translate the address of the indirection location and another to translate the address in the indirection location. For these reasons indirection is preferably restricted to a number of dedicated address registers per connection located in interface memory. This arrangement introduces the awkwardness of a separate name space, but avoids host memory accesses in the critical path for indirection. Each connection has a number of contiguous locations to form a register "window". For convenience and flexibility, each connection is allowed to dynamically allocate the window size at connection set up time. The base and bounds fields 148 and 149 in the connection table entry 142 point to the beginning and end of this window respectively. This scheme allows the overlapping and nesting of register windows to effect different sharing and protection.

One problem with using address registers is that the receiver may wish to restrict the access a sender has to certain address registers. For example, the receiver might not wish to allow the sender to have the direct ability to increment a pointer to a queue. For these purposes, the address registers also include protection bits 144, which indicate what type of access a sender may have to the data in these registers. Three types of access are protection provided for: read, write, and indirect. Indirect access allows a sender to use this information in an operation without allowing the sender to determine the actual value. For example, an indirect address operation with postincrement can read the register and increment it by a specified amount, even if the sender does not have permission to directly read or write the register. An exception occurs if the sender specifies an operation involving an address register access in a way not permitted by the access protection. The host processor can thereupon choose to access the register directly.

Although address register protection allows a receiver to restrict sender access, the sender still names all of the operands in an operation. This lack of isolation can lead to other types of protection problems. For example, a sender could still give inconsistent operands, e.g., an operand priority and priority queues that do not match, or specify the wrong registers. To solve this problem, operand names are isolated from the sender by being accessible only to the receiver.

To provide such isolation, the receiver could decode the operation to find the receiver operands or simply interrupt the host processor (which incurs significant overhead). To allow sufficient flexibility in operand specification, this first alternative requires programmable control at the receiver which increases complexity. Nevertheless, a fairly simple implementation of this alternative is presented later. To support the very common case of indirection with postincrement, the following special case is added to the previous primitives:

effaddr=<addreg$_i$>;
addreg$_i$←<addreg$_i$>+<addreg$_{i+1}$>.

To use this special indirect addressing mode, the sender only specifies an index i in the operand. The receiver uses address register i for indirection and automatically uses the next register for the postincrement amount.

The connection table 140, endpoint table 160, and address registers 170 may be allocated from memory in the network interface which typically is either a static random access memory (SRAM) or a dynamic random access memory (DRAM).

A conventional translation look-aside buffer (TLB) 180 is used to map an address indicated by the message into a physical address (PA). The TLB is preferably a fully associative cache. The TLB matches on bits identifying the endpoint as well as on the virtual address (VA) since multiple endpoints may have the same VA. The TLB also stores an indication of the access rights to the physical address.

The connection table 140, endpoint table 160, address registers 170 and TLB 180 are interconnected in the following manner. The endpoint number 146 output from the connection table 142 is used as the input to the endpoint table 160. The base 148 and bounds information 149 from the connection table are 140 fed respectively to an adder 156 and a comparator 158. The adder also receives the index from the received ATM cell (128 in FIG. 7) and its output is also fed to the comparator 158. The comparator acts as a filter through which a valid address to the address registers 170 is provided, otherwise an error trap occurs.

The endpoint table 160 has its outputs for the base 164 and bounds 166 connected respectively to an adder 172 and comparator 174. The adder 172 also receives an offset from the received ATM cell (in operand field 126 in FIG. 7). A multiplexer 176 receives the output of the adder 172 the base 164 from the endpoint table 160 and the offset from the received ATM cell. The output of the multiplexer 176 is applied to an input of an arithmetic logic unit (ALU) 178. The ALU also receives as another input a value read from the address registers 170. The outputs of the ALU 178 are a condition code which connects to the receive controller (228 in FIG. 8) and a result which is connected to a demultiplexer 179 and the address registers 170. The demultiplexer 179 also receives as another input the output of adder 172. The output of the demultiplexer 179 is applied to another input of the comparator 174. The output of the comparator 174 is either an error or an address within the endpoint range which is then input to the TLB 180.

Figure 10:
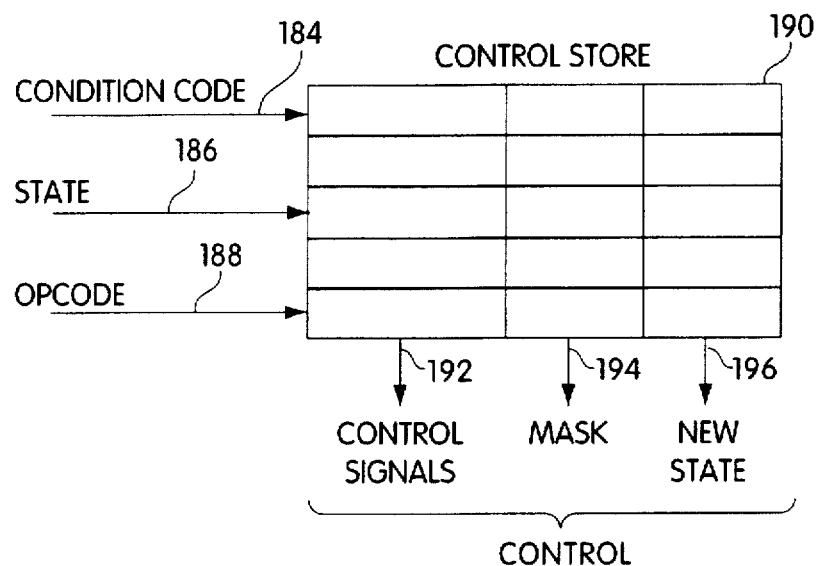
FIG. 10 is a block diagram of an example realization of the receive controller shown in FIG. 8.

The receive controller 228 is used to control the multiplexer 176, ALU 178, demultiplexer 179, and read and write of the address register 170 in accordance with the state information 150 from the connection topco 140, the opcode/control information from the received ATM cell (130 and 122, respectively, in FIG. 7), and the condition code from the ALU 178. There is great flexibility within the receive controller 228 with respect to features supported and the implementation of these features. If only the basic five addressing modes described above are implemented, and because these modes are very simple, the system implementing them can be hardwired via a finite state machine. FIG. 10 shows a sketch of such a table-driven implementation. The sender controller 234 could be realized in a manner analogous to the receive controller 228.

In FIG. 10, the condition code, state and opcode are respectively inputs 184, 186 and 188 which are used to index a table 190. The outputs to the table are control signals 192 to the multiplexer, demultiplexer, ALU and latches (not shown), new state information 194 and a mask 196. The use of these outputs will be described in more detail below. In FIG. 9, these outputs are all subsumed by the line labelled control from the receive controller to the operation logic.

Figure 9:
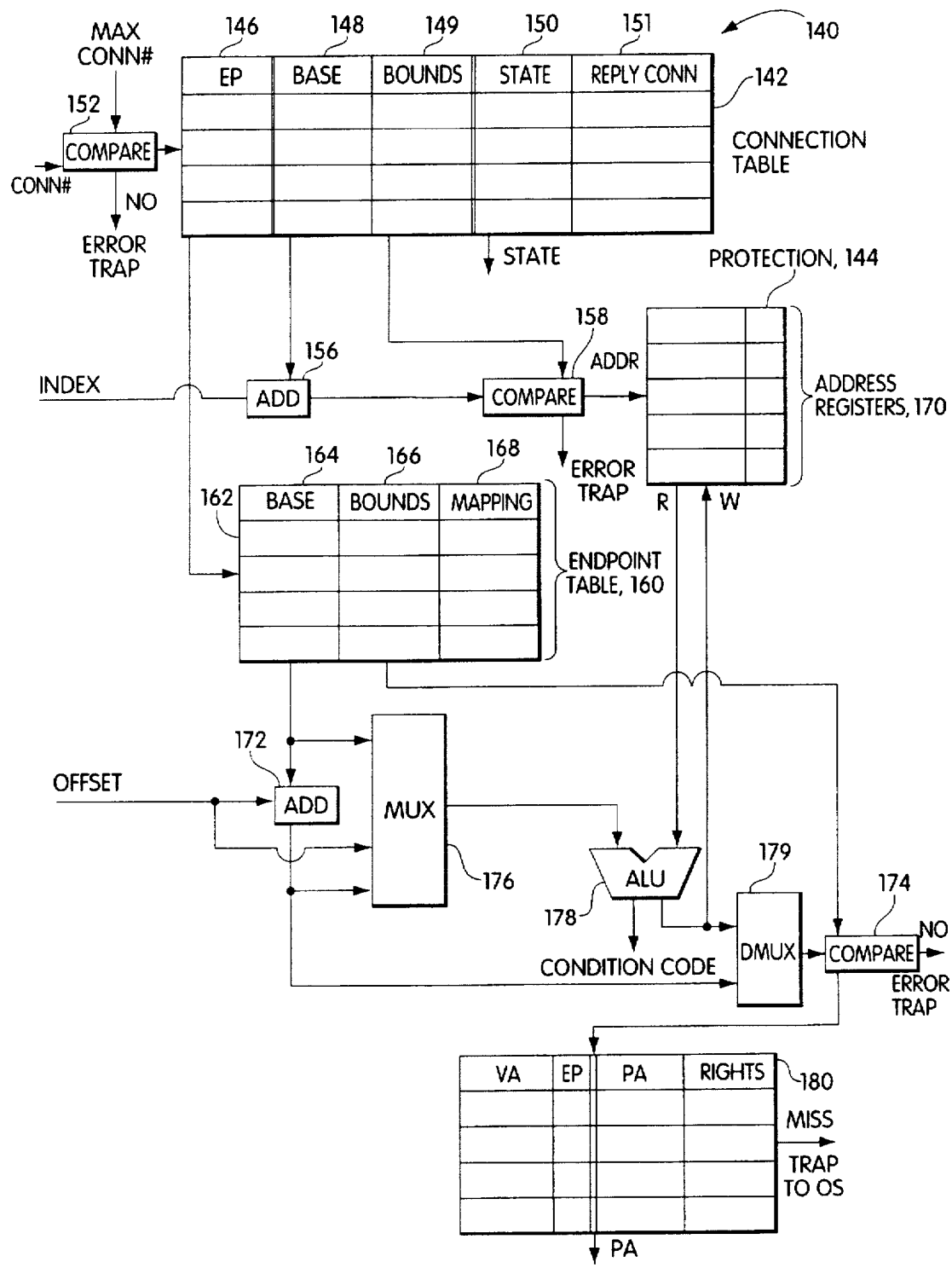
FIG. 9 is a block diagram of the receive side operation logic of FIG. 8 showing protection and address generation portions.

Although not shown in FIG. 9, there are data paths to the connection table 140, endpoint table 160, address registers 170, and TLB 180 so that the host processor can read and write their contents. This functionality is provided so the operating system can maintain the tables and TLB and so applications can access and manipulate the address registers. Direct application access to the address registers poses a protection problem though. The easiest solution is to deny direct access and force applications to access the address registers only via operating system calls. However, this solution makes address register access expensive. Another solution is to pap the address registers into the application virtual address (VA) space. That is, address registers of each connection are mapped to a different physical address range. Then some additional circuitry could extract the connection number from this physical address and use the address register base 148 and bounds 149 in the connection table 140 to access the appropriate region of the address registers 170. With this solution an operating system call is required only to establish the mapping. Thereafter an application can access address registers using the same address register base and bounds circuitry used by incoming messages.

Although the endpoint base has been described as a VA, it could also be a physical address (PA). In fact, if the base is a PA, the mapping can be simplified to merely a bounds check, however incurring two constraints. The first constraint is that an endpoint larger than a page is allocated on wired down consecutive physical pages. The second constraint is that the address registers can only contain relative addresses or PAs, otherwise VA to PA mapping is still required. The first constraint restrains use of host memory, especially if dynamically sized endpoints are desired. The second constraint means that either an application cannot use full address pointers for indirection or the operating system is invoked explicitly to map a pointer to a PA before storing the pointer in an address register.

The functioning of operation logic 230 will now be described. A connection number (conn#) is derived from the message which is used to index into the connection table 140. Protection is provided by insuring that the connection number is within the table size, i.e. is a valid connection number, for example by using the comparator 152.

The index value from the ATM cell is added to the base 148 from the connection table 140 using adder 156. This sum is then compared with the bounds 149 by comparator 158. If the sum is within the bounds, it is provided as an address to the address registers 170. Otherwise, an error trap occurs. A value from the address register is thus obtained and may be applied to the ALU 178.

The endpoint number obtained from the connection table 140 is used to retrieve the base 164 which is added to the offset value from the received ATM cell using adder 172. This sum is applied to the multiplexer 176 and demultiplexer 179. The multiplexer is controlled so as to select one of the base 164, the sum from the adder 172 and the offset to be applied to the ALU 178. The ALU is controlled to perform operations on the value received from the address registers 170 and the output of the multiplexer to provide a condition code and an address. The operations which can be performed by the ALU 178 include, but are not limited to, operations on address register contents, such as adding for post-increment mode, logical operations and comparison, e.g., for conditional interrupts. The ALU can be used for various other operations on the address register contents. Unless conditional interrupts and operations on the address registers are to be restricted to addressing modes that do not use the address registers, the address register memory should be multi-ported or clocked faster than the rest of the operation logic 230.

The result provided by the ALU 178 may be applied to the address registers 170. The demultiplexer 179 is controlled so as to select one of the sum from the adder 172 and the result from the ALU 178. The result is compared with the bounds 166 for the endpoint using comparator 174 to add to the protection described above.

The final line of protection is finding a valid mapping entry in the TLB 180 for the address output from the comparator 174. A TLB miss, either because the desired address mapping is not present in the TLB or because of inadequate access rights, causes an exception to be delivered to the operating system. While handling a TLB miss via an exception to the host processor uses little hardware, it has the disadvantage of blocking further processing of incoming cells while the miss is serviced. These incoming cells preferably are throttled and buffered but may also be discarded. Alternatively the interface may either use hardware to service TLB misses or have dedicated mapping per endpoint to reduce or eliminate misses. The former choice is hardware intensive, inflexible, and still will delay cell processing because of delays in accessing the host memory for mapping information. The latter choice might be workable if the endpoint table is expanded to contain one or two mapping entries per endpoint. However, such expansion leads to a space and performance tradeoff.

The receive controller 228 decodes the opcode field 129 and uses the condition code from the ALU 178 and the state information 150 from the connection table 140 to determine what to do with the incoming ATM cell. The control signals output by the receive controller 228 are determined according to the opcode and condition code and are used to effect a desired addressing mode and to store the data. The mask output 194 (see FIG. 10) selects which elements, e.g. using a 4-byte granularity, of the data are actually stored in the receiver memory. For a 32 byte data block, the mask can be taken directly from 4 bits of the opcode field.

The connection state 150 records connection addressing information across cells in a multiple cell message. The first cell in a multiple cell message is a "control" cell that chooses the addressing mode and specifies the offset and index. This information is stored in the state field of the connection table 140 so that subsequent cells for the same connection can omit the control information and thus carry more data. For example, the first cell could have 32 bytes of data and subsequent cells could have 48 bytes of data (perhaps in AAL5 format). Each subsequent cell uses the control information stored in the connection table state field. The end of such a data cell sequence could be indicated either by storing a cell count in the state field, or by using the standard AAL5 format wherein the last cell in such a sequence carries the length and a CRC. Every cell is checked until a correct CRC is found. Assuming a multi-cell message terminates with a CRC, this scheme could transfer N data blocks of 32 bytes each in [2/3 (N−1)]+2 cells for N>1, which asymptotically achieves 3/2 the bandwidth compared to sending one 32 byte data block per cell.

Many other functions as described above can be implemented by adding to the opcodes interpreted by the receive controller 228.

Any error trap to the operating system may be handled by either discarding the cell or by inserting the cell in an error queue and signaling an exception to the operating system.

Having now described the receive portion of the front end, the send portion will now be described. Both control information and data are provided to send a cell. The control information comes from a set of send registers 236 which each connection has for sending cells. The first three registers in this set store the control information, i.e., the opcode, operand, and index, for the cell. The data comes either from the endpoint associated with the connection or from a special block of send registers, which is useful for formulating read requests.

The set of send registers 236 for each connection also contains a status register, a mode register and a "go" register. The status register contains the number of cells sent. If initialized to 1, it will be set to 0 when the interface actually sends the cell. This feature is useful to serve as an acknowledgment that a sent cell has actually left the interface since a cell might not be sent right away due to flow control or an exception. The mode register enables two variants of sending which will be described below. The go register is used to actually cause a cell to be sent as will be described below.

As discussed previously, numerous implementation options are possible for the front end. Several different embodiments are presented here. A first embodiment of the front end architecture in FIG. 9 uses minimal hardware. Address register operations are restricted to at most one address register read and write operation per cell. Endpoint pages are pinned in physical memory while the buffer is active. Remote reads are handled by the host processor, via an interrupt. The first restriction means that any combination of the primitive operations listed above acting on address registers acts on the same address register. Also, any binary operations obtain one argument from the message operand. Thus the postincrement amount for indirect addressing operations is specified by the message, which does not completely isolate the receiver state from the sender. Alternatively, the desired functionality can be composed from a sequence of messages, e.g., the postincrement amount could be specified via a register add in a following message. Although pinning the endpoint pages prevents large endpoints and even restricts the number of small endpoints, these restrictions lead to a simple architecture.

The receive side of this embodiment is as described above, except that, because the endpoint pages are pinned in this architecture, the endpoint table 160 contains the physical address of the base of an endpoint. However, since physical pages are not necessarily allocated contiguously, a TLB "cache" of address translation pairs is used to map the sum of an endpoint base address and offset, labeled "VA" in FIG. 9 to the appropriate physical address. For endpoints of one page or less is size, the PA may be stored directly in the base field 164 of the endpoint table entry 162. A direct mapping bit is added to all endpoint table entries 162 to control interpretation of the base field. Additional mapping entries could be added to the endpoint table 160 to accommodate larger endpoints.

The operation of the send side is as follows. First, the send endpoints are restricted to be integral page sizes. To authorize sending to a particular connection without a kernel call, each outgoing connection from an endpoint has a unique virtual mapped command area at a fixed offset (in the high order virtual address bits) from the endpoint virtual pages and the same size as the endpoint. These connection command pages map uncached to the network interface. The send registers 236 for the connection are mapped into the page just below the base of the connection command region.

To send a block of data at an offset from the base of the source endpoint to the network via connection C, a write operation is performed to the location at the same offset from connection C's command base. The value written is ignored. After mapping, the low order physical address bits are the physical address (or an offset as described later) of the data block in the endpoint to send and the high order physical address bits contain the connection number. The send controller extracts the control information from the send registers 236 of the connection and reads the data block to compose a cell. Alternatively, the data can come from a special block of send registers 236 as discussed above.

With some host processors there may not be sufficient bits to encode both the physical address of the data block and the connection number, as well as the send controller 234 address, into a physical address. Two alternatives are possible in this such systems. The first alternative is to replace the physical address of the data block with the offset from the endpoint base. This requires the base address of an endpoint to be accessible to the send controller 234 and endpoint physical pages preferably to be stored contiguously.

The second alternative is to use a right-shifted version of the physical address of the data block. A very convenient choice is to shift right by five bits. Since data blocks are addressed at 32 byte granularity, the least significant five bits of the physical address are unused anyway, assuming a byte-addressed machine. This shifting frees five bits in the physical address for encoding the connection number and send controller 234 address. However, this right shifting has repercussions. Since the page offset is not changed by virtual memory mapping, the endpoint command virtual address and the data block physical address are linked by the following constraint: the five most significant bits in the endpoint command virtual page offset correspond to the five least significant bits of the data block physical page number. This constraint has three consequences. First, the endpoint command region is a factor of 32 smaller than the endpoint: each entry in the command region now maps to the base of a data block. Consequently, each block of contiguous 32 pages in the endpoint has the same memory protection. Second, endpoints are multiples of 32 pages in size. This constraint can be relaxed if the send controller 234 can access the endpoint base and size. Third, endpoints are mapped to contiguous chunks of 32 pages aligned with a 32 page memory boundary.

The mode register enables two variants of the send procedure. In the first, the operand is taken from the value actually written to the connection command region. The second causes an exception if an attempt is made to send when the status field is non-zero. The "go" register is not used in this embodiment.

Any state operated on by the cell, e.g. write to address registers, is not updated until after the point of the last possible exception point, a TLB miss, for that cell. The cell is retained in the input FIFO and processing of further cells from that connection is blocked until re-enabled by the host processor; cells are only removed from the input FIFO when a cell "commits" after the last exception point.

In the second embodiment, the three restrictions of the first embodiment are removed to obtain three major enhancements: no pinning of endpoint pages, remote reads without interrupting the host processor, and a richer set of register and conditional operations. To support this first enhancement, the endpoint table 160 contains virtual addresses and the TLB maps from virtual addresses to physical addresses. This enhancement also introduces a new category of exceptions: page faults from references to paged out endpoint pages. These are treated as another class of exceptions and are serviced by the host processor, which maintains the main virtual mapping tables. The operating system is now responsible for keeping the mapping information consistent with the host memory state.

To handle remote reads without the interrupting the host processor, the address mapping for the read data is computed. To do so, the receiver side, which does mapping, is reused for sending, i.e. the operation logic 230 is multiplexed between the receiver side and the sender side. In this embodiment, in fact, the operation logic 230 is used for all sends and not just sends requested by remote reads. Consequently it is no longer necessary to use the virtually mapped command pages for protection. However, in this embodiment, the virtually mapped send registers are retained. To send a block of data at an offset from the base of source endpoint, the offset is written into the "go" register for the appropriate connection attached to that endpoint. This write causes a data block at the offset, 32 byte block aligned, from the endpoint base to be read and composed into a cell with the control information in the opcode, operand, and index registers and sent via the associated connection. A multiple send mode is also added in which the status register is set to the number of cells to send starting at the specified offset.

In this embodiment, three primitive operations can be executed per message: address generation, register operations, and conditionals. A main opcode controls the selection and ordering of the primitive operations. Example opcodes are read, read multiple, write, write multiple, and software exception which causes an interrupt to the host processor. The instruction format allows up to three different register operands to be named in addition to an immediate operand. To accommodate all the accesses to the address register 170, the register operations are all triple clocked. Due to potential side effects, state recovery after exceptions is more complicated.

It is sometimes preferable to have greater flexibility in control functionality and cell interpretation than may be provided by the first two embodiments. For example, operations for locking or swap-and-compare may be desired. Also, it might be useful to customize the cell level protocol for certain applications. Ultimately, flexibility could be available in the form of full programmability, which is always a tradeoff between complexity and cost. Two ways to add flexibility to the previous embodiments are to make the receive and send controllers 228 and 234 writable, and to add a programmable finite state machine for cell interpretation. The first non-header word of an ATM cell may index into a writable control memory that interprets the remaining fields of the cell and sets all the control signals. This control memory might have a number of common cell interpretations hardwired in and a number of programmable ones, perhaps even connection-dependent interpretations. However, a micro-processor should also be considered for this purpose.

Thus, a third embodiment uses a conventional microprocessor, in effect a communication co-processor, for the entire front end. The microprocessor simplifies the hardware since all of the internal control logic of the microprocessor is leveraged and its own TLB can be used as the TLB 180. The endpoint number may be incorporated in the high address bits of the VA. Also, fully programmable cell interpretation and control may be obtained.

Although the third embodiment provides flexibility, even at 155 Mbps, it may be difficult to use a microprocessor for everything. It makes more sense to use a microprocessor to interpret high level operations. For example, a microprocessor could be particularly effective for relieving the host processor of responsibility for read operations. Such a communications co-processor could still benefit from hardwired address generation and mapping circuitry to help reduce the computation burden.

A fourth embodiment uses a programmable cell interpreter and so is a hybrid of the hardware control of the first two embodiments and the microprocessor control of the third embodiment. Any complex decoding or operations are handled by either a host processor or a co-processor. In this embodiment, the various functional units required are preferably implemented on a programmable gate array, using DRAM for the various tables. This basic functionality may even function as a front-end for a co-processor so that the co-processor would have a reduced load. This can be very helpful to realize both high performance and flexibility at high date rates like 622 Mbps or 1.2 Gbps.

Where possible, these embodiments could easily be pipelined for high performance. However, at 155 Mbps data rates, bytes of data arrive at about 50 nsec intervals, which should be long enough to complete the address and control setup. It may be necessary to buffer the data for about a word or so to satisfy memory hierarchy access times. At 622 Mbps only a few pipeline stages should be necessary.

As described above, any of these embodiments for the front end 210 is also connected to a "back end" 214 of the network interface for connecting the front end to the memory of its host. Three embodiments for such a back end will now be described.

In a first embodiment, the front end may connect directly to the main memory bus. A cache controller snoops this bus to ensure coherency.

Alternatively, while a direct memory connection is attractive performance-wise, it is only an option to computer builders. An I/O bus interface such as the PCI bus would be accessible to a far greater market. The disadvantage of most I/O buses, including the PCI bus, is delay in gaining control of the bus due to the activity of other bus devices, thus some degree of on-board buffering is used which adds to latency.

As another alternative, a direct cache interface could be used which does not require processor modifications. In this embodiment the network connects directly to external processor cache. This direct coupling of the network to a cache may reduce the copying of message data. To avoid unduly diluting this cache with network traffic, and thus negatively impacting the performance of the processor to which it connects, another embodiment couples the network to a separate message cache 252 as shown in FIG. 11.

Figure 11:
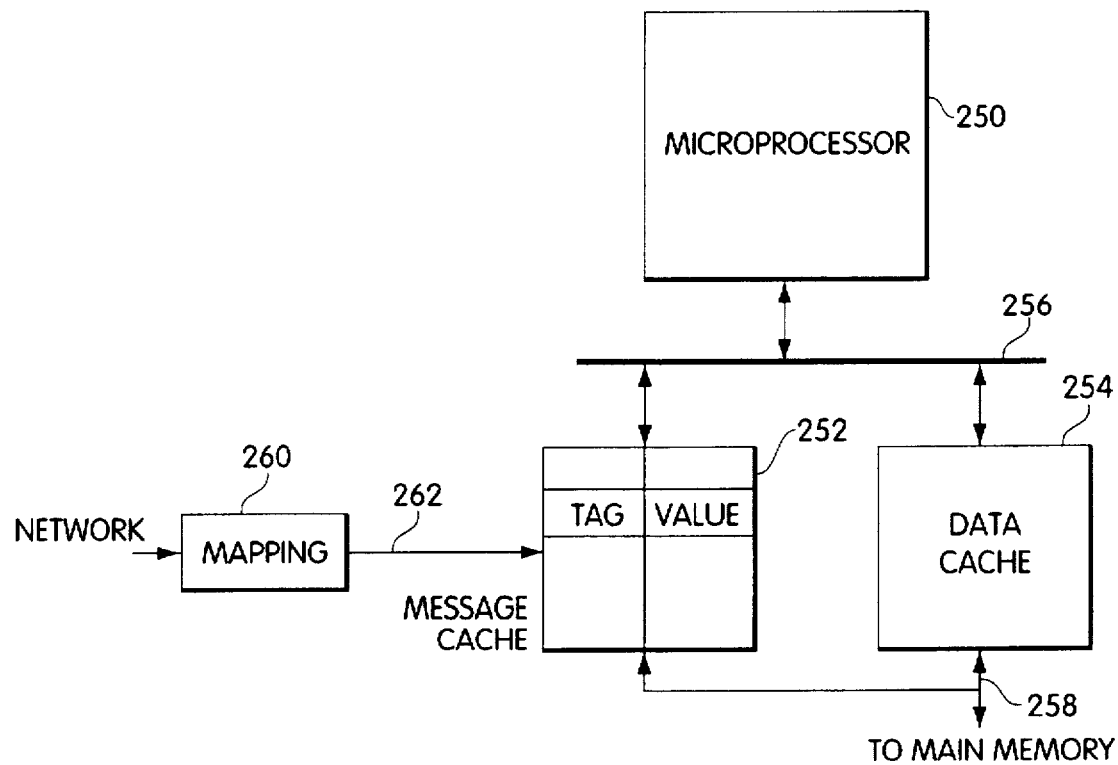
FIG. 11 is a block diagram of a direct cache interface.

In FIG. 11, a message cache 252 is connected to the micro-processor 250 via a bus 256. The message cache 252 is also connected to data cache 254 and main (or host) memory (not shown) via a bus 258. A mapping unit 260 connects to the message cache via bus 262 and to the network.

This message cache 252 is fully integrated into the memory hierarchy (as shown by connections 256 and 258), so there is no need to copy data from a message buffer to the memory hierarchy before a process can access the data. The interface may be implemented at the secondary cache level, and thus no expensive, special purpose, or custom processor modifications are required. By restricting the data size of messages to be equal to the cache blbck size, e.g., 32 bytes, cache blocks can be updated atomically, eliminating complicated and slow circuitry for updating partial cache blocks.

A problem in this direct cache interface in FIG. 11 is maintaining coherency between the message cache 252 and cache 254 using a low overhead mechanism. To solve this problem, the magnitude of the incoherency problem is reduced by allowing only the network to write into the message cache 252. Then each write into the message cache 252 checks for and invalidates any blocks in the data cache 254 with a matching tag. The impact of this checking on the data cache 254 is minimized by performing the checks on a shadow copy of the data cache tags. Further details on such a direct cache interface may be found in a copending U.S. patent application entitled "Low Latency Network Interface", filed Nov. 16, 1993 by Randy B. Osborne.

Numerous modifications and variations to the embodiments of the network interface can be made. For example, exception handling and flow control can be integrated in the front-end, for the following reasons. Exceptions caused by error traps, protection violations, unimplemented operations, TLB misses, and page faults, e.g., host memory page faults, and possibly connection and endpoint table page faults, can slow cell processing in this system and thus lead to a flow control problem. Cell processing can also be blocked to ensure atomicity during host processor accesses to this system memory structures. For error traps, this problem can be avoided entirely by immediately discarding the offending cells or pushing it into a buffer overflow problem by putting such cells on an exception queue for examination at the convenience of the operating system. Of course, discarding the offending cells will not work for the other exception types because even if the offending cell is discarded and an implicit or explicit "retry" message is returned to the sender, the exception condition still has to be repaired before forward progress can be made. In the meantime, incoming cells are discarded, buffered, or throttled.

However, this only applies to incoming cells belonging to the same connection affected by the exception condition. Cells belonging to other connections can be processed once the exception condition is saved. Cells belonging to the exception incurred connection cannot be processed, even if they are not affected by the exception, i.e., they do not cause a TLB miss or page fault, since some applications may depend on the guarantee of sender ordering of ATM cells. Since this ordering guarantee is per channel, which maps to connection in this system, it is acceptable to continue processing cells which belong to different connections but share the same endpoint as an exception incurred cell. Of course, these cells may cause an exception.

A strategy for dealing with exceptions is provided will now be discussed. First, the offending cell is removed from the front end as quickly as possible. Cells causing error traps can be discarded or queued. Other cells are retained in the input FIFO. The connection is then marked as exceptioned. Flow control is invoked next to throttle senders transmitting further cells for that connection. In the meantime, any further cells which arrive for that connection are buffered, whereas other connections may continue processing cells. Only the first step is necessary for error traps. Global "exceptions", like blocking the system during host processor accesses, require throttling and buffering across all connections. The throttling and buffering are compatible with credit-based flow control schemes.

Hybrid address mapping could be used as an alternative to a large global TLB for mapping. That is, each endpoint buffer table entry could contain one or two mappings and the TLB could contain the rest. This hybrid mapping is a generalization of the idea, discussed above in connection with the first front end embodiment, of inserting the mapping for single page endpoints directly in the endpoint table. The mappings in the endpoint table entries could be managed by the application so as to always contain mappings likely to be used soon.

Locality in the connection and endpoint tables can also be managed. That is, with many connections and large endpoints, the respective tables might be large in size. One idea to reduce the table sizes required is to exploit locality by essentially "paging" out entries from the tables. On a page fault when accessing these tables, the interface can remove the page faulting cell from the cell processing pipeline and buffer and flow control further cells for the page faulted connection as described above. The host processor can then perform the actual "paging" of the tables, restore state, and restart cell processing for the faulted connection.

Structures can also be added to provide fair network access and to prevent network deadlock. That is, processes are prevented from interfering with each other either by blocking the network or by congesting the network and inducing deadlock in other processes. To ensure fairness some form of admission control could be provided that limits the duration that one connection can send to the network if other connections have pending, non-flow controlled traffic. For performance reasons it is also a good idea to give priority to operating system traffic. Preventing deadlock requires several steps. First, each connection has independent flow control. Independent flow control per VCI/VPI if fairly standard in ATM networks and interfaces. Second, any global exceptions that block processing of all cells have bounded duration. Third, cells requiring a response from the network are removed even though the reply connection may be flow controlled. This removal is made possible by reserving some buffer capacity for reply traffic, such as by allocating a separate VCI/VPI with associated flow control buffers, per connection just for reply traffic. Admission control should favor reply traffic over new traffic.

To ensure at least the operating system can always make progress, it should also have its own connection. Any pages that the operating system might use, such as in the connection and endpoint tables and address registers, should be locked down to prevent unbounded delay due to page thrashing.

Global address registers may also be used in the front end. In the embodiments described above, address registers are currently private to each connection. This could make it inconvenient for several different connections to the same endpoint to share a common queue. One way to solve this problem is to add a number of address registers that are global to the endpoint, rather than being strictly local to connections. The endpoint table could contain base and bounds to such global registers in the same memory as the local registers.

Fragmentation buffers can also be provided in the front end. That is, for multi-cell messages, matching the 48 byte payload of ATM AAL5 to power of 2 memory and cache block sizes leads to fragmentation problems. For example, with 32 byte blocks, there will be 16 byte fragments. Both the sender and the receiver may keep fragmentation buffers to fragment and then reassemble 32 byte blocks, or whatever the memory and cache block size is. However, it highly likely that it will be possible to leverage whatever segmentation and reassembly support there is already is in a standard high bandwidth ATM interface for this fragmentation purpose.

The sender and receiver addresses also may not be aligned with respect to a memory or cache block. Assuming that (mis)alignment is the same at the sender and receiver, an aligned block can be sent and the portions that should not be received can be merely masked out. This may not lead to the best utilization of cells, but such misalignment is likely to be rare. Another possible performance penalty is that some architectures may restrict subblock addressing, so it may be necessary to read a whole block in order to write it selectively under a mask. The masking, or scatter, operation is done at the receiver. The sender may also perform masking, but without a gather capability it is optional: it might be useful for security to prevent certain fields from going out on the network, but it does not improve efficiency.

In some cases the sending address may be unaligned both respect to block boundaries and with respect to the receiver address. Shifting, in addition to masking, is required to deal with this problem. To solve this problem, alignment shifters can be added.

A prefetch queue could also be used in the front end because prefetching is useful for hiding latency. The system described above actually already supports prefetch queues. To provide complete prefetching, a processor that can initiate prefetches, such as the DEC Alpha, may be used and some hardware that can decode prefetch operations from this processor and turn them into real fetches. It is probably not possible to put such hardware on a I/O bus-based interface; but it could certainly be done, as it was done in the Cray Tera 3D, in designs where the network interface connects directly to the data bus. Provided that a fetch can be initiated in some way, the return address of the fetch is simply listed as the tail of a queue. The conditional interrupt scheme could even be used to indicate when the queue is nonempty.

Also, in some applications, it may desirable to provide greater isolation between the sender and the receiver.

In direct deposit model presented above, the sender places an instruction and operands directly into a message. Operands may be immediate, or reference some state (in the address registers) in the receiver. The receiver executes the instruction. As described earlier, access restrictions on the address registers provide some degree of protection and isolation. However, there still may be inadequate isolation for some applications due to the fact that a sender still has to name all the instruction operands, even if it cannot access those operands. One way to solve this problem is simply to interrupt the host processor to perform actions requiring isolation, as in receiver-based addressing systems.

Another way to solve this problem is to allow the direct instruction (operation) in a message to be replaced by a pointer to an instruction in the receiver (an instruction pointer). The instruction may directly reference receiver operands, e.g. in the address registers, without knowledge of the sender. Messages can still provide immediate operands and name receiver operands, though the receiver may choose not to use these operands, as may be necessary to maintain isolation.

Figure 13:
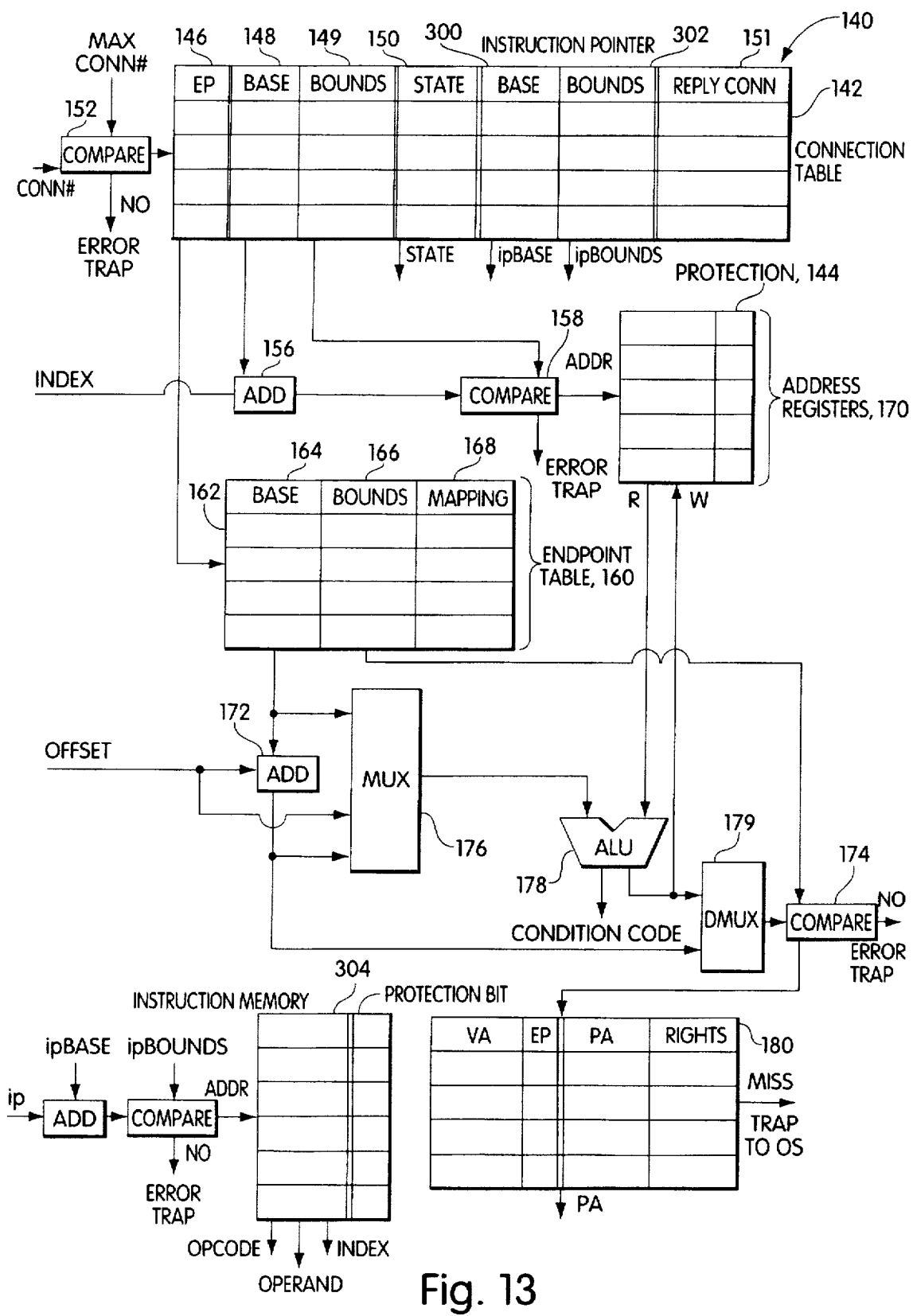
FIG. 13 is a block diagram of the receive side operation logic of FIG. 8 in a second embodiment of this invention.

One simple embodiment of this solution will now be presented. The principle modification to the receive side as described to this point is to add an instruction and operand buffer area as shown in FIG. 13. The connection table 140 now contains base and bounds entries 300 and 302, similar to that for address registers, for access to an instruction memory 304. To keep the scheme simple, each instruction is composed of an operation and operands in exactly the same format as in an ATM cell as described earlier. The operation controls from which location—the instruction memory 304 in the receiver or the message—operands are taken. Protection bits, similar to those for the address registers 170, allow the receiver to control which instructions serve as entry points to the sender.

Three are at least enhancements to this scheme. The first is global instructions. Many connections are likely to share the same operations, though on different operands. To accommodate this expectation, a capability is added for global instructions. These are instructions that are globally accessible across all connections. They are constrained to operate only on sender-supplied operands to minimize the difficulty of operating on different receiver operands.

The second enhancement is separate instruction and operand memory. Instruction and operand memory could be separated at the cost of complexity to save memory storage.

The third enhancement is providing multiple instructions per cell. A sequencer can be added to step the receiver through several instructions per cell. The first instruction in such a sequence serves as the entry point.

It is easy to further add conditional sequencing operations, subroutines, etc. However, to keep the interface simple, more complex functionality is best obtained by trapping to the host processor or by adding a co-processor, such as a micro-processor.

Having now described a few embodiments of the invention, and some modifications and variations thereto it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as limited only by the appended claims and equivalents thereto.

What is claimed is:

1. A communication system, comprising:

a sender having a processor which outputs requests that messages be sent at and a network interface connected to the processor which forms a message, in response to a request from the processor;

a receiver comprising a processor controlled by an operating system and connected to a network interface having a memory;

wherein the message formed by the sender contains an operand, an indication of a desired operation and a reference to information in the memory in the network interface of the receiver;

a network, connected between the network interface of the sender and the network interface of the receiver, for communicating the message between the sender and the receiver;

wherein the network interface of the receiver includes an input buffer for receiving the message and means, responsive to the message in the input buffer, for performing the operation indicated by the message according to the operand in the message and the information in the memory in the network interface of the receiver only if the operation is permitted to be performed by the receiver; and wherein the operand indicates an address in a host memory in the receiver and wherein the action is depositing the message at a location in the host memory in the receiver according to the address in the message and the information in the memory of the network interface of the receiver.

2. The communication system of claim 1, wherein the operand in the message indicates an address register for storing an address in the host memory of the receiver and the information in the memory of the network interface of the receiver is the address stored in the address register, the communication system further comprising in the receiver:

means for obtaining the address from the indicated address register; and means for storing the message in the host memory at the obtained address.

3. The communication system of claim 2, wherein the operand further indicates an offset and the communication system further comprises means for updating the address in the address register by the offset.

4. The communication system of claim 1, wherein the receiver includes means for comparing the operand to the information in the network interface of the receiver, and means for generating an interrupt when the means for comparing indicates that the message requires immediate action.

5. The communication system of claim 4, further comprising means for updating the information in the memory of the network interface of the receiver.

6. The communication system of claim 4, further comprising means for queueing the message when the means for comparing indicates that the message does not require immediate action.

7. The communication system of claim 4, wherein the operand in the message indicates an offset and an address register storing an address in a host memory of the receiver and the information in the memory of the network interface of the receiver is the address stored in the address register, the communication system further comprising, in the receiver:

means for obtaining the address from the indicated address register; and means for storing the message in the host memory at the offset from the obtained address.

8. A method for communication in a system having a sender and a receiver interconnected by a network, wherein the receiver has a network interface connected between the network and a host processor and host memory controlled by an operating system, the method comprising the steps of:

sending a message from the sender through the network to the receiver, wherein the message includes an operand, an indication of the operation to be performed and a reference to information in a memory of the network interface of the receiver;

receiving the message at the receiver;

insuring that the operation to be performed for the sender is permitted at the receiver; and if the action is permitted, performing, separate from the processor and operating system, the operation at the receiver according to the operand in the message and the information in the memory of the network interface of the receiver; and wherein the operand indicates an address in a memory in the receiver and wherein the step of performing an operation is the step of depositing the message at a location in the host memory in the receiver according to the address in the message and the information in the memory of the network interface of the receiver.

9. The method of claim 8, wherein the operand in the message indicates an address register for storing an address in the host memory of the receiver and the information in the memory of the network interface of the receiver is the address stored in the address register, the method further comprising the steps of:

obtaining the address from the indicated address register; and storing the message in the host memory at the obtained address.

10. The method of claim 9, wherein the operand further indicates an offset and the communication system further comprises the step of updating the address in the address register by the offset.

11. The method of claim 8, wherein the step of performing an operation comprises the steps of:

comparing the operand to the information in the memory of the network interface of the receiver; and generating an interrupt when the step of comparing indicates that the message requires immediate action.

12. The method of claim 11, further comprising the step of updating the information in the memory of the network interface of the receiver.

13. The method of claim 11, further comprising the step of queueing the message when the step of comparing indicates that the message does not require immediate action.

14. The method of claim 11, wherein the operand in the message indicates an offset and an address register for storing an address in the host memory of the receiver and the information in the memory of the network interface of the receiver is the address stored in the address register, the communication system further comprising the steps of:

obtaining the address from the indicated address register; and storing the message in the host memory at the offset from the obtained address.

15. A communication system for a computer system having a sender and a receiver interconnected by a network, wherein the receiver has a network interface connected between the network and a host processor and host memory controlled by an operating system, the communication system comprising:

means, at the sender, for sending over the network to the receiver a message which includes an operand, an indication of an operation to be performed and a reference to information in a memory in the network interface of the receiver;

means, in the network interface of the receiver, for receiving the message;

means, in the network interface and operative in response to receipt of the message, for determining whether the operation is permitted to be performed at the receiver; and means, in the network interface and operative when the operation is permitted, for obtaining an additional operand using the reference to information in the memory of the network interface of the receiver, and for performing the operation, separate from the host processor and operating system, using the operand in the message and the additional operand; and wherein the operand indicates an address in the host memory in the receiver and wherein the means for performing an operation includes means for depositing the message at a location in the host memory in the receiver according to the address in the message and the information in the memory of the network interface of the receiver.

16. The communication system of claim 15, wherein the operand in the message indicates an address register in the network interface for storing an address in the host memory of the receiver and the information in the memory of the network interface of the receiver is the address stored in the address register, the communication system further comprising:

means for obtaining the address from the indicated address register; and means for storing the message in the host memory at the obtained address.

17. The communication of claim 16, wherein the operand further indicates an offset and the system further comprises the means for updating the address in the address register by the offset.

* * * * *